US009367203B1

(12) United States Patent
Costello

(10) Patent No.: US 9,367,203 B1
(45) Date of Patent: Jun. 14, 2016

(54) USER INTERFACE TECHNIQUES FOR SIMULATING THREE-DIMENSIONAL DEPTH

(71) Applicant: Amazon Technologies, Inc., Reno, NV (US)

(72) Inventor: Kevin Robert Costello, Seattle, WA (US)

(73) Assignee: Amazon Technologies, Inc., Reno, NV (US)

(*) Notice: Subject to any disclaimer, the term of this patent is extended or adjusted under 35 U.S.C. 154(b) by 248 days.

(21) Appl. No.: 14/046,638

(22) Filed: Oct. 4, 2013

(51) Int. Cl.
*G06F 3/0481* (2013.01)

(52) U.S. Cl.
CPC .................................. *G06F 3/04815* (2013.01)

(58) Field of Classification Search
CPC ....................................................... G06T 15/60
See application file for complete search history.

(56) References Cited

U.S. PATENT DOCUMENTS

| 4,866,778 A | 9/1989 | Baker et al. |
| 5,563,988 A | 10/1996 | Maes et al. |
| 5,616,078 A | 4/1997 | Oh |
| 5,621,858 A | 4/1997 | Stork et al. |
| 5,632,002 A | 5/1997 | Hashimoto et al. |
| 5,960,394 A | 9/1999 | Gould et al. |
| 6,185,529 B1 | 2/2001 | Chen et al. |
| 6,272,231 B1 | 8/2001 | Maurer et al. |
| 6,385,331 B2 | 5/2002 | Harakawa et al. |
| 6,434,255 B1 | 8/2002 | Harakawa |
| 6,594,629 B1 | 7/2003 | Basu et al. |
| 6,701,306 B1 | 3/2004 | Kronmiller et al. |
| 6,728,680 B1 | 4/2004 | Aaron et al. |
| 6,750,848 B1 | 6/2004 | Pryor |
| 6,863,609 B2 | 3/2005 | Okuda et al. |
| 6,985,145 B2 | 1/2006 | Knighton et al. |
| 7,039,198 B2 | 5/2006 | Birchfield |
| 7,082,393 B2 | 7/2006 | Lahr |
| 7,301,526 B2 | 11/2007 | Marvit et al. |

(Continued)

FOREIGN PATENT DOCUMENTS

| CN | 1694045 A | 11/2005 |
| JP | 2002-164990 | 6/2002 |

(Continued)

OTHER PUBLICATIONS

Nokia N95 8GB Data Sheet, Nokia, 2007, 1 page.

(Continued)

*Primary Examiner* — Joni Richer
*Assistant Examiner* — Grace Q Li
(74) *Attorney, Agent, or Firm* — Polsinelli LLP

(57) ABSTRACT

Systems and approaches provide for user interfaces (UIs) that are based on a user's viewing angle and/or motion and orientation of the computing device. The UI elements of the framework can be rendered based on head tracking and/or device motion/orientation data to provide a user the impression that the UI elements exist in an environment having three-dimensional (3D) depth. To further enhance the impression of 3D depth, UI elements positioned at depths perceived to be closer to the user can cast shadows upon UI elements positioned at depths appearing to be further away from the user. During the course of operating the computing device, the depths of certain UI elements can change. The UI elements can be rendered to correspond to such changes in depth, and shadows for the UI elements can be recast to be consistent with the rendered UI elements.

19 Claims, 12 Drawing Sheets

(56) References Cited

U.S. PATENT DOCUMENTS

| | | | |
|---|---|---|---|
| 7,379,566 B2 | 5/2008 | Hildreth | |
| 7,401,783 B2 | 7/2008 | Pryor | |
| 7,439,975 B2 | 10/2008 | Hsu | |
| 7,519,223 B2 | 4/2009 | Dehlin et al. | |
| 7,587,053 B1 | 9/2009 | Pereira | |
| 7,613,310 B2 | 11/2009 | Mao | |
| 7,688,317 B2 | 3/2010 | Berger | |
| 7,760,248 B2 | 7/2010 | Marks et al. | |
| 7,761,302 B2 | 7/2010 | Woodcock et al. | |
| 7,817,163 B2 | 10/2010 | Hanggie et al. | |
| 8,150,063 B2 | 4/2012 | Chen et al. | |
| 8,296,151 B2 | 10/2012 | Klein et al. | |
| 8,345,046 B2 | 1/2013 | Norrby | |
| 8,502,817 B2 | 8/2013 | Deb et al. | |
| 8,570,320 B2 | 10/2013 | Izadi et al. | |
| 2002/0071277 A1 | 6/2002 | Starner et al. | |
| 2002/0194005 A1 | 12/2002 | Lahr | |
| 2003/0083872 A1 | 5/2003 | Kikinis | |
| 2003/0171921 A1 | 9/2003 | Manabe et al. | |
| 2004/0122666 A1 | 6/2004 | Ahlenius | |
| 2004/0140956 A1 | 7/2004 | Kushler et al. | |
| 2004/0205482 A1 | 10/2004 | Basu et al. | |
| 2005/0064912 A1 | 3/2005 | Yang et al. | |
| 2005/0232587 A1 | 10/2005 | Strawn et al. | |
| 2006/0143006 A1 | 6/2006 | Asano | |
| 2007/0164989 A1 | 7/2007 | Rochford et al. | |
| 2008/0005418 A1 | 1/2008 | Julian | |
| 2008/0013826 A1 | 1/2008 | Hillis et al. | |
| 2008/0019589 A1 | 1/2008 | Yoon | |
| 2008/0040692 A1 | 2/2008 | Sunday et al. | |
| 2008/0136916 A1 | 6/2008 | Wolff | |
| 2008/0158096 A1 | 7/2008 | Breed | |
| 2008/0174570 A1 | 7/2008 | Jobs et al. | |
| 2008/0246759 A1 | 10/2008 | Summers | |
| 2008/0266530 A1 | 10/2008 | Takahashi et al. | |
| 2008/0276196 A1 | 11/2008 | Tang | |
| 2009/0031240 A1 | 1/2009 | Hildreth | |
| 2009/0079813 A1 | 3/2009 | Hildreth | |
| 2009/0265627 A1 | 10/2009 | Kim et al. | |
| 2009/0313584 A1 | 12/2009 | Kerr | |
| 2010/0079371 A1* | 4/2010 | Kawakami | G06F 3/0485 345/156 |
| 2010/0179811 A1 | 7/2010 | Gupta et al. | |
| 2010/0233996 A1 | 9/2010 | Herz et al. | |
| 2010/0280983 A1 | 11/2010 | Cho et al. | |
| 2011/0164105 A1 | 7/2011 | Lee et al. | |
| 2011/0184735 A1 | 7/2011 | Flaks et al. | |
| 2011/0285807 A1 | 11/2011 | Feng | |
| 2012/0038645 A1* | 2/2012 | Norrby | G06T 15/60 345/426 |
| 2013/0194269 A1* | 8/2013 | Matas | G06T 11/60 345/426 |
| 2014/0325455 A1* | 10/2014 | Tobin | G06F 3/04815 715/850 |
| 2015/0091903 A1 | 4/2015 | Costello et al. | |
| 2015/0170396 A1* | 6/2015 | Kornmann | G06T 1/20 345/419 |

FOREIGN PATENT DOCUMENTS

| | | |
|---|---|---|
| JP | 2002-351603 | 12/2002 |
| JP | 2004-318826 | 11/2004 |
| JP | 2007-121489 | 5/2007 |
| JP | 2008-97220 | 4/2008 |
| WO | 02/15560 A3 | 2/2002 |
| WO | 2006/036069 A1 | 4/2006 |
| WO | WO 2009/155688 | 12/2009 |
| WO | WO 2015/048529 | 4/2015 |

OTHER PUBLICATIONS

"Face Detection: Technology Puts Portraits in Focus", Consumerreports.org, http://www.comsumerreports.org/cro/electronics-computers/camera-photograph/cameras, 2007, 1 page.

"Final Office Action dated Oct. 27, 2011", U.S. Appl. No. 12/332,049, 66 pages.

"Final Office Action dated Feb. 26, 2013", U.S. Appl. No. 12/879,981, 29 pages.

"Final Office Action dated Apr. 16, 2013", U.S. Appl. No. 12/902,986, 31 pages.

"Final Office Action dated Jun. 6, 2013", U.S. Appl. No. 12/332,049, 70 pages.

"First Office Action dated Mar. 22, 2013", China Application 200980146841.0, 39 pages.

"International Search Report dated Apr. 7, 2010", International Application PCT/US2009/065364, 2 pages.

"International Written Opinion dated Apr. 7, 2010", International Application PCT/US2009/065364, 7 pages.

"Introducing the Wii MotionPlus, Nintendo's Upcoming Accessory for the Revolutionary Wii Remote at Nintendo:: What's New", Nintendo Games, http://www.nintendo.com/whatsnew/detail/eM-MuRj_N6vntHPDycCJAKWhE09zBvyPH, Jul. 14, 2008, 2 pages.

"Non Final Office Action dated Nov. 13, 2012", U.S. Appl. No. 12/879,981, Nov. 13, 2012, 27 pages.

"Non Final Office Action dated Nov. 7, 2012", U.S. Appl. No. 12/332,049, 64 pages.

"Non Final Office Action dated Dec. 21, 2012", Korea Application 10-2011-7013875, 4 pages.

"Non Final Office Action dated Dec. 26, 2012", U.S. Appl. No. 12/902,986, 27 pages.

"Non Final Office Action dated Apr. 2, 2013", Japan Application 2011-537661, 2 pages.

"Non Final Office Action dated Jun. 10, 2011", U.S. Appl. No. 12/332,049, 48 pages.

"Notice of Allowance dated May 13, 2013", U.S. Appl. No. 12/879,981, 9 pages.

"Office Action dated May 13, 2013", Canada Application 2,743,914, 2 pages.

Blimes, Jeff A. , "A Gentle Tutorial of the EM Algorithm and its Application to Parameter Estimation for Gaussian Mixture and Hidden Markov Models", International Computer Science Institute 4, No. 510, Email from D. Nguyen to J.O'Neill (Amazon) sent Jun. 5, 2013, 1998, 15 pages.

Brashear, Helene et al., "Using Multiple Sensors for Mobile Sign Language Recognition", International Symposium on Wearable Computers, 2003, 8 pages.

Cornell, Jay , "Does This Headline Know You're Reading It?", h+ Magazine, located at <http://hplusmagazine.com/articles/ai/does-headline-know-you%E2%80%99re-reading-it>, last accessed on Jun. 7, 2010, Mar. 19, 2010, 4 pages.

Haro, Antonio et al., "Mobile Camera-Based Adaptive Viewing", MUM '05 Proceedings of the 4th International Conference on Mobile and Ubiquitous Mulitmedia., 2005, 6 pages.

Hjelmas, Erik , "Face Detection: A Survey", Computer Vision and Image Understanding 83, No. 3, 2001, pp. 236-274.

Padilla, Raymond , "Eye Toy (PS2)", <http://www.archive.gamespy.com/hardware/august03/eyetoyps2/index.shtml, Aug. 16, 2003, 2 pages.

Purcell, "Maximum Liklihood Estimation Primer", http://statgen.iop.kcl.ac.uk/bgim/mle/sslike_1.html, May 20, 2007.

Schneider, Jason , "Does Face Detection Technology Really Work? Can the hottest new digital camera feature of 2007 actually improve your people pictures? Here's the surprising answer!", http://www.adorama.com/catalog.tpl?article=052107op=academy_new, May 21, 2007, 5 pages.

Tyser, Peter , "Control an iPod with Gestures", http://www.videsignline.com/howto/170702555, Sep. 11, 2005, 4 pages.

Valin, Jean-Marc et al., "Robust Sound Source Localization Using a Microphone Array on a Mobile Robot", Research Laboratory on Mobile Robotics and Intelligent Systems; Department of Electrical Engineering and Computer Engineering; Universite de Sherbrooke, Quebec, Canada, 9 pages, year 2003.

Van Veen, Barry D. et al., "Beamforming a Versatile Approach to Spatial Filtering", IEEE ASSP Magazine, 1988.

Yang, Ming-Hsuan et al., "Detecting Faces in Images: A Survey", IEEE Transactions on Pattern Analysis and Machine Intelligence, vol. 24, No. 1, 2002, pp. 34-58.

(56) References Cited

OTHER PUBLICATIONS

Zyga, Lisa, "Hacking the Wii Remote for Physics Class", PHYSorg.com, http://www.physorg.com/news104502773.html, Jul. 24, 2007, 2 pages.

International Search Report and Written Opinion, mailed Dec. 29, 2014, 12 pages, for International Patent Application PCT/US2014/057836, listed as item #13 above.

\* cited by examiner

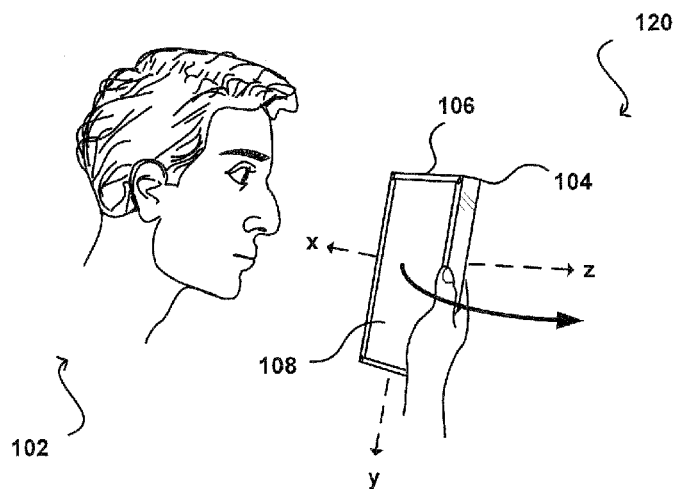
FIG. 1D
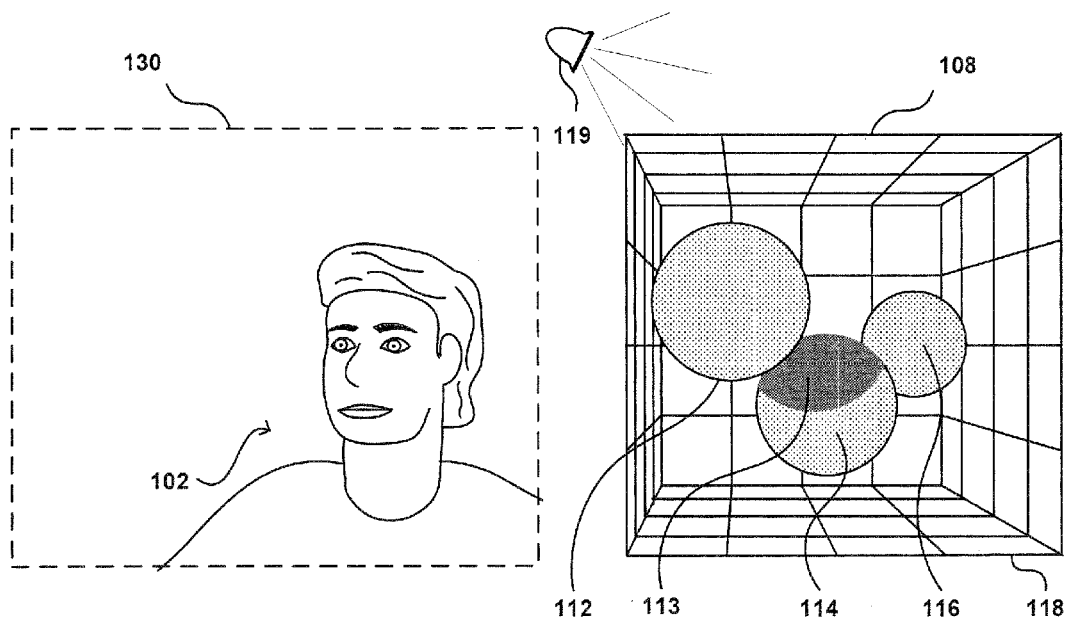
FIG. 1E
FIG. 1F

USER INTERFACE TECHNIQUES FOR SIMULATING THREE-DIMENSIONAL DEPTH

BACKGROUND

As computing devices, such as laptops, tablets, or smartphones, become increasingly sophisticated, new and interesting approaches have arisen for enabling such devices to convey information to a user and vice versa. For instance, a graphical user interface (GUI) incorporating windows, icons, and menus may be an improvement over a command-line interface by simplifying how a user operates an underlying software application. A user can cause the underlying application to perform a desired function without having to memorize a command or its syntax and manually typing in the command. As another example, a touch-based interface can be an upgrade over an interface that relies on a directional keypad (e.g., up, down, left, right) by giving users a more immediate and precise way of selecting a UI element. Further, a touch-based interface may provide a more intuitive manner of operating a computing device by enabling users to directly manipulate UI elements. As devices become more powerful and new approaches are developed for users to interact with computing devices, UIs can be further improved upon to provide a more compelling and user-friendly computing experience.

BRIEF DESCRIPTION OF THE DRAWINGS

Various embodiments in accordance with the present disclosure will be described with reference to the drawings, in which:

FIGS. 1A-1I illustrate an example approach for providing a user interface that is based on tracking of a head or face of a user in accordance with an embodiment;

DETAILED DESCRIPTION

Figure 1A:
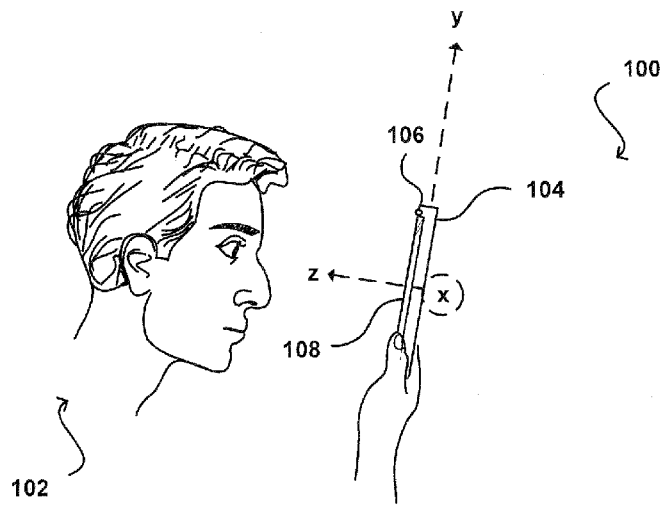

In various embodiments, user interfaces that are based at least in part on a user's position with respect to a computing device and/or motion/orientation of the computing device are provided. One or more user interface (UI) elements may be presented on a two-dimensional (2D) display screen, or other such display element. One or more processes can be used to determine a relative position, direction, and/or viewing angle of the user. For example, head or face tracking (or tracking of a facial feature, such as a user's eyebrows, eyes, nose, mouth, etc.) and/or related information (e.g., motion and/or orientation of the computing device) can be utilized to determine the relative position of the user, and information about the relative position can be used to render one or more of the UI elements to correspond to the user's relative position. Such a rendering can give the impression that the UI elements are associated with various three-dimensional (3D) depths. Three-dimensional depth information can be used to render 2D or 3D objects such that the objects appear to move with respect to each other as if those objects were fixed in space, giving the user an impression that the objects are arranged in three-dimensional space. Three-dimensional depth can be contrasted to conventional systems that simulate 2D depth, such as by stacking or cascading 2D UI elements on top of one another or using a tab interface to switch between UI elements. Such approaches may not be capable of conveying as much information as a user interface capable of simulating 3D depth and/or may not provide as immersive an experience as a UI that simulates 3D depth.

Various embodiments enable UI elements to be displayed so as to appear to a user as if the UI elements correspond to 3D depth when the user's position changes, the computing device is moved, and/or the device's orientation is changed. The UI elements can include images, text, and interactive components such as buttons, scrollbars, and/or date selectors, among others. When it is determined that a user has moved with respect to the computing device, one or more UI elements can each be redrawn to provide an impression that the UI element is associated with 3D depth. Simulation of 3D depth can be further enhanced by integrating one or more virtual light sources for simulating shadow effects to cause one or more UI elements at depths closer to the user to cast shadows on one or more UI elements (or other graphical elements or content) at depths further away from the user. Various aspects of the shadows can be determined based at least in part on properties of the virtual light source(s), such as the color, intensity, direction of the light source and/or whether the light source is a directional light, point light, or spotlight. Further, shadows can also depend on the dimensions of various UI elements, such as the x-, y-, and z-coordinates of at least one vertex of the UI element, such as the top left corner of the UI element; the width and height of a planar UI element; the width, height, and depth for a rectangular cuboid UI element; or multiple vertices of a complex 3D UI element. When UI elements are rendered based on changes to the user's viewing angle with respect to the device, the shadows of UI elements can be recast based on the properties of the virtual light source(s) and the rendering of the UI elements at the user's new viewing angle.

In some embodiments, the 3D depths of one or more UI elements can be dynamically changed based on user interaction or other input received by a computing device. For example, an email application, instant messenger, short message service (SMS) text messenger, notification system, visual voice mail application, or the like may allow a user to sort messages according to criteria such as date and time of receipt of a message, sender, subject matter, priority, size of message, whether there are enclosures, among other options. To simultaneously present messages sorted according to at least two dimensions, the messages may be presented in conventional list order according to a first dimension and by 3D depth order according to a second dimension. Thus, when a user elects to sort messages by a new second dimension, the 3D depths of messages can change. As another example, in a multi-tasking environment, users may cause the 3D depths of running applications to be altered based on changing focus between the applications. The user may operate a first application which may initially have focus and be presented at the depth closest to the user. The user may switch operation to a second application which may position the second application at the depth closest to the user and lower the first application below the depth closest to the user. In both of these examples, there may also be other UI elements being presented on the display screen and some of these other UI elements may be associated with depths that need to be updated. That is, when the 3D depth of a UI element changes, the UI element may cease to cast shadows on certain UI elements and/or cast new shadows on other UI elements. In still other embodiments, UI elements may be redrawn or rendered based on a change of the relative position of the user such that shadows cast by the redrawn UI elements must also be updated. In various embodiments, a UI framework can be enhanced to manage 3D depth of UI elements, including whether a UI element casts a shadow and/or whether shadows are cast on the UI element and the position, dimensions, color, intensity, blur amount, transparency level, among other parameters of the shadows.

Various other functions and advantages are described and suggested below in accordance with the various embodiments.

FIGS. 1A-1I illustrate an example approach for providing a user interface that is based on tracking of a head or face of a user in accordance with an embodiment. In the example situation 100 of FIG. 1A, a user 102 can be seen viewing a display screen 108 of a computing device 104. Although a portable computing device (e.g., a smart phone, tablet, or portable media player) is shown that can be held in the user's hands, it should be understood that other types of computing devices can utilize aspects of the various embodiments as should be apparent in light of the teachings and suggestions contained herein. The computing device can include at least one camera 106 located on the front of the device and the on same surface as the display screen to capture image data of subject matter facing the front of the device, such as the user 102 viewing the display screen. It should be understood that, while the components of the example device are shown to be on a "front" of the device, there can be similar or alternative components on the "top," "side," or "back" of the device as well (or instead). Further, directions such as "top," "side," and "back" are used for purposes of explanation and are not intended to require specific orientations unless otherwise stated. In some embodiments, a computing device may also include more than one camera on the front of the device and/or one or more cameras on the back (and/or sides) of the device capable of capturing image data facing the back surface (and/or top, bottom, or side surface) of the computing device. In this example, the camera 106 comprises a digital camera incorporating a CMOS image sensor. In other embodiments, a camera of a device can incorporate other types of image sensors (such as a charged couple device (CCD)) and/or can incorporate multiple cameras, including at least one wide-angle optical element, such as a fish eye lens, that enables the camera to capture images over a wide range of angles, such as 180 degrees or more. Further, each camera can comprise a digital still camera, configured to capture subsequent frames in rapid succession, or a video camera able to capture streaming video. In still other embodiments, a computing device can include other types of imaging elements, such as ambient light sensors, IR sensors, and other optical, light, imaging, or photon sensors.

Figure 1B:
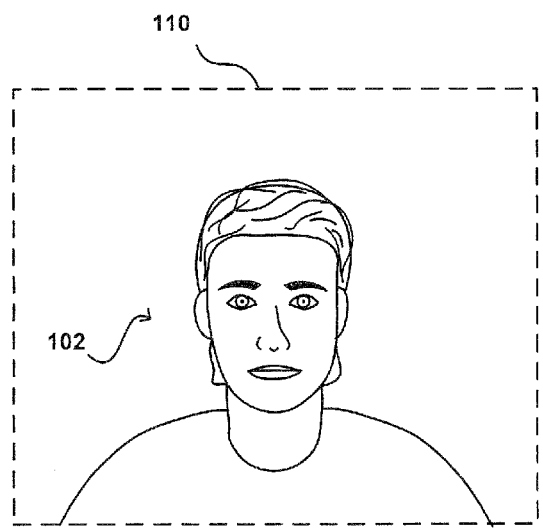

As illustrated in FIG. 1B, when the user 102 positions the computing device in front of himself and gazes directly towards the display screen such that the x-y plane of the device is perpendicular or substantially perpendicular to the user's line of sight (where the lateral axis corresponds to the x-axis, the longitudinal axis corresponds to the y-axis, and the depth of the device corresponds to the z-axis), the image data captured by the front-facing camera of the device can include the image 110. Although one image is shown to be captured in this instance, it will be appreciated that multiple images captured by a same camera at successive times, multiple images captured by multiple cameras at the same time or substantially the same time, or some combination thereof can be analyzed in various embodiments. Further, other embodiments may additionally or alternatively use other approaches, such as proximity sensors, to determine the position of the user relative to the device and/or the viewing angle of the user with respect to the device. In this example, the device is capable of rendering one or more graphical elements for display on the two-dimensional display screen according to a viewing angle of the user with respect to the display screen. The device can rely on the position of the head or face of the user with respect to the device and/or the apparent motion of the user's head or face with respect to the device to draw or render one or more graphical elements on the display screen so as to simulate depth.

Figure 1C:
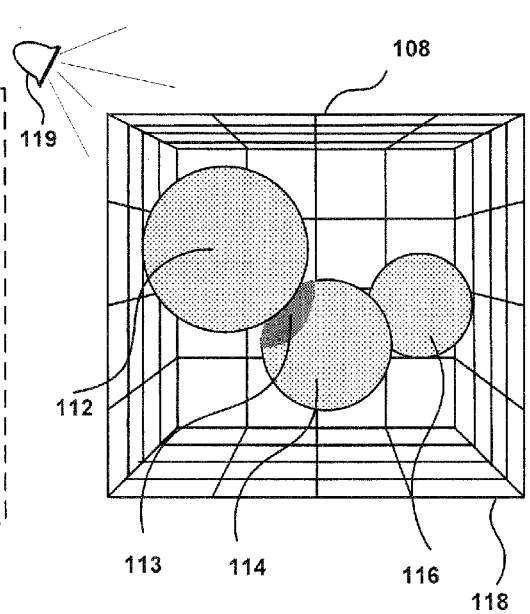

FIG. 1C illustrates an example of a user interface presented on the display screen 108 based on the user's viewing angle with respect to the device. The user interface includes three user interface elements 112, 114, and 116 displayed within a 3D grid 118. UI elements 112, 114, and 116 may be buttons for a user application that would normally appear to be the same size and shape to the user. However, here, UI elements 112, 114, and 116 have each been scaled to give the user the impression that the UI elements are associated with different depths. In particular, UI element 112 appears to be at a depth closest to the user and corresponds to a largest scale, UI element 114 appears to be positioned at an intermediate depth and corresponds to an intermediate scale, and UI element 116 appears to be at depth furthest away from the user and corresponds to the smallest scale. It will be appreciated that other transformations can also be applied to UI elements to simulate depth, including rotations, translations, perspective projections, among other transformations. To further enhance an impression that the user interface has depth, a virtual light source 119 may be positioned off-screen at the top left corner of a 3D grid-box 118. As mentioned, the shadows generated by a virtual light source can depend on the color, intensity, direction, position, and/or falloff function of the light source. Further, the light source can be modeled as a directional light, a point light, or a spotlight. A directional light is produced by a light source at an infinite distance from the scene and all of the rays emanating from the light source strike UI elements from a single parallel direction and with equal intensity everywhere. A point light, as in the example of FIG. 1C, is a light that gives off equal amounts of light in all directions. UI elements closer to the light may appear brighter than those further away. A spotlight is a light that radiates light in a cone with more light emanating from the center of the cone and gradually tapering off the further the away from the center. Modeling a light source based on one of a directional light, point light, or spotlight is known to those of ordinary skill in the art, and will not be discussed in detail herein. In some embodiments, the virtual light source may not be fixed as in the example of FIGS. 1C, 1F, and 1I. Instead, the virtual light source may be positioned with respect to a user and/or a computing device such that when the user and/or computing device move, the virtual light source also moves with the user and/or computing device.

In this example, virtual light source 119 is positioned such that UI element 112 casts a shadow 113 on UI element 114. UI element 114, on the other hand, does not cast a shadow on UI element 116 because UI element 116 appears at a y-position above UI element 114. Approaches for drawing or rendering shadows for UI elements are discussed in co-pending U.S. patent application Ser. No. 14/035,897, entitled "Generating Virtual Shadows for Displayable Elements," filed on Sep. 24, 2013, which is incorporated herein by reference.

In FIG. 1D, an example situation 120 illustrates that the user 102 has tilted the computing device 104 to the right with respect to the user, i.e., the user has rotated the device to his right along the longitudinal or y-axis. As seen in FIG. 1E, the tilt or rotation of the device causes the camera to capture a different view or perspective of the user within image 130, here, a three-quarters profile of the head or face of the user facing leftward. The position of the user's face may also be shifted towards a right region of the image 130 because of the rightward tilt or rotation of the device. In this example, the apparent motion of the face or head of the user (which may be primarily due to the motion of the device) can be tracked from the initial position detected in FIG. 1B to the new position depicted in FIG. 1E. Based on the apparent movement of the user's head or face, the user interface can be redrawn or rendered for display to correspond to the new viewing angle of the user 102. For example, as illustrated in FIG. 1F, when the user tilts the device rightward, the device will apply rotations, scales, translations, perspective projections, among other transformations, to elements 112, 114, 116, and 118 based on the new viewing angle of the user. In particular, 3D grid 118 has been skewed such that the right face of the grid appears more prominently in the display screen 108 while the left face of the grid is presented at more of an oblique angle when the user rotates the device laterally to the right. UI elements 112, 114, and 116 are also redrawn or rendered to correspond to the new viewing angle of the user with respect to the device. Further, shadow 113 has been recast to be consistent with the off-screen virtual light source 119 and the transformed UI elements 112 and 114 such that shadow 113 appears much larger in FIG. 1F than in FIG. 1C.

Figure 1G:
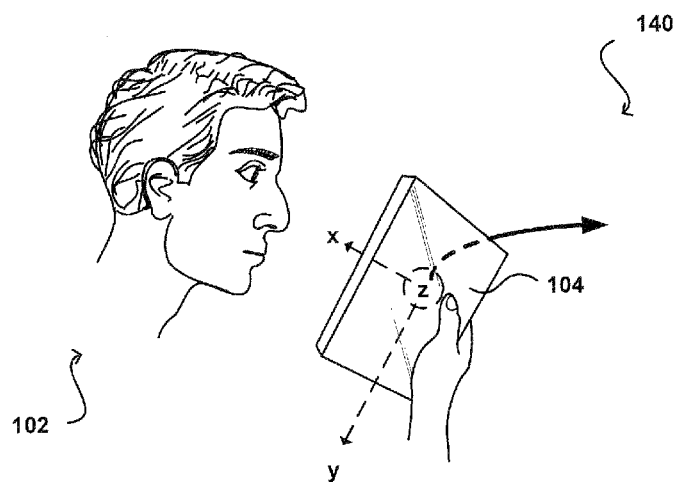
Figures 1H, 1I:
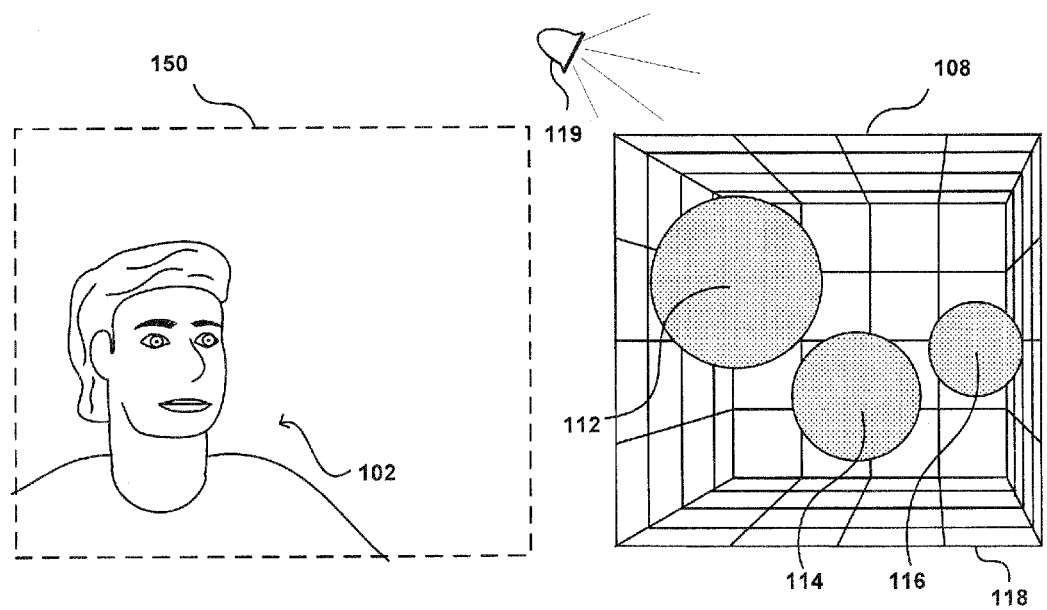

FIG. 1G illustrates an example situation 140 wherein the user 102 has tilted the computing device 104 to the left with respect to the user, i.e., the user has rotated the device to his left along the longitudinal or y-axis. As seen in the image 150 of FIG. 1H, the tilt or rotation of the device causes the camera to capture a three-quarters profile of the head or face of the user facing rightward, and the position of the user's face has also shifted towards a left region of the image 150. In this example, the apparent movement of the face or head of the user (which, again, may be primarily due to the movement of the device) can be tracked from the previous position depicted in FIG. 1E to the new position depicted in FIG. 1H. The UI elements 112, 114, 116, and 118 can be redrawn or rendered for display based on the apparent motion of the user's head or face as seen in FIG. 1I. For example, the user may be positioned as depicted in FIGS. 1D (and 1E) and may subsequently tilt the device laterally towards his left until the user's viewing angle is perpendicular or substantially perpendicular with respect to the device as depicted in FIGS. 1A (and 1B) (e.g., the user's initial position). The UI elements presented on the display screen 108 may be rendered or animated from what is seen in FIG. 1F to what is seen in FIG. 1C. In particular, the 3D grid 118 may be unskewed or otherwise transformed, UI elements 112, 114, and 116 may be rotated, translated, scaled, or otherwise transformed back to their original projections, and shadow 113 may be recast to correspond to the position of the virtual light source 119 and/or the original projections of UI elements 112 and 114. It will be appreciated that in various embodiments. Interim user positions between when the user is positioned as seen in FIGS. 1D (and 1E) and when the user is positioned as seen in FIGS. 1A (and 1B) can be detected by the device. Interim transformations can be applied to the UI elements such that there may be a smooth animation effect for the transformation of the UI elements as seen in FIG. 1F to the UI elements as seen in FIG. 1C.

As the user continues rotating the device towards his left, the user interface may transform and/or be animated from the scene depicted in FIG. 1C to the scene depicted in FIG. 1I. In particular, the 3D grid 118 may be rendered such that the left face of the grid is presented more prominently and the right face of the grid is displayed at a more oblique angle, and UI elements 112, 114, and 116 may also be rotated, translated, scaled, or otherwise transformed in accordance with the new viewing angle of the user as seen in FIGS. 1G and 1H. In this example, the new viewing angle of the user causes UI elements 112, 114, and 116 to be rendered such that they no longer overlap. As a result, UI element 112 no longer casts a shadow on UI element 114. It will be appreciated that the head or face of the user can generally be tracked according to six degrees of freedom (e.g., motion along the x-, y-, and z-axes or forward/backward, up/down, and left/right, and rotation along the x-, y-, and z-axes or pitch, yaw, and roll) and the device can be configured to appropriately respond to such various motions. For example, when the user tilts the device backwards and to his right (i.e., such that the top left corner of the device is the closest point of the device to the user), the right and bottom faces of the 3D grid 118 may be displayed more prominently and the left and top faces may be displayed less prominently. When the user tilts the device forward and towards his left (i.e., such that the bottom right corner of the device is the closest point of the device to the user), the left and top faces of the grid can be displayed with greater detail, and the right and bottom faces may be presented with fewer details. Such an approach may give a user an impression that he is interacting with the UI elements in an environment having 3D depth.

In addition, or alternatively, a computing device can include one or more motion and/or orientation determination components, such as an accelerometer, gyroscope, magnetometer, or a combination thereof, that can be used to determine the position and/or orientation of the device. In some embodiments, the device can be configured to monitor for a change in position and/or orientation of the device using the motion and/or orientation determination components. Upon detecting a change in position and/orientation of the device exceeding a specified threshold, the UI elements presented on the device can be redrawn or rendered to correspond to the new position and/or orientation of the device to simulate 3D depth. In other embodiments, input data captured by the motion and/or orientation determination components can be analyzed in combination with images captured by one or more cameras of the device to determine the user's position with respect to the device or related information, such as the user's viewing angle with respect to the device. Such an approach may be more efficient and/or accurate than using methods based on either image analysis or motion/orientation sensors alone. These various approaches—image-based head tracking of the user, motion/orientation sensor-based monitoring of the device, or a combined approach—are discussed in co-pending U.S. patent application Ser. No. 13/965,126, entitled, "Robust User Detection and Tracking," filed Aug. 12, 2013, which is incorporated herein by reference.

In addition to monitoring a viewing angle of the user and/or motion/orientation of a computing device to draw or render a user interface based on changes to the viewing angle of the user and/or motion/orientation of the device, approaches in accordance with various embodiments also enable the depths of UI elements to be modified dynamically and UI elements to be redrawn or rendered appropriately with such modifications. Thus, a user application may be adapted to cause the depth of certain UI elements to be changed based on how a user interacts with the application and/or the application otherwise receiving other input. For example, a conventional user interface for "trending topics" may comprise a "word cloud" or arrangement of keywords. The size, color, font, and other display properties of each keyword may vary based on the popularity, relevance, and other such factors associated with each keyword. Such a user interface can be used for social networking, photography, news aggregation, and search engine applications, among others. Depth cues can be used to enhance these user interfaces by additionally or alternatively associating keywords with various depths. As the popularity, relevance, or other such ranking associated with each keyword changes in real time or the user modifies a query to alter the collection of keywords or the ranking of each keyword, the depths associated with each keyword can be adjusted to reflect the new state of the keyword. As another example, a conventional user interface may enable highlighting of content such as by underlining, bolding, italicizing, changing the color or background color, or otherwise modifying text content or bounding image content by primitive geographic shapes (e.g., ellipse, rectangle) or the contours of an object represented in the image content. Such user interfaces can be improved by additionally or alternatively associating highlighted content at various depths (e.g., depths appearing to be closer to the user and/or display screen) and content that is not highlighted at different depths (e.g., depths appearing to be further away from the user and/or display screen).

Figure 2A:
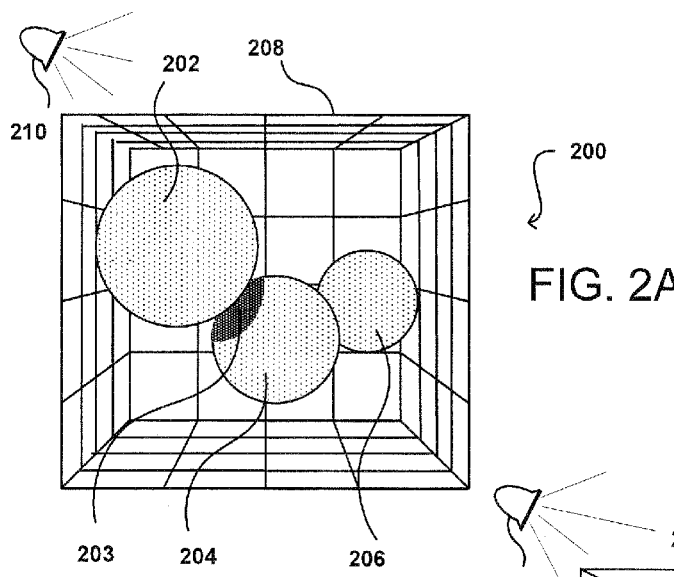
FIGS. 2A-2C illustrate an example approach for dynamically updating simulated depth for user interface elements in accordance with an embodiment.
Figure 2B:
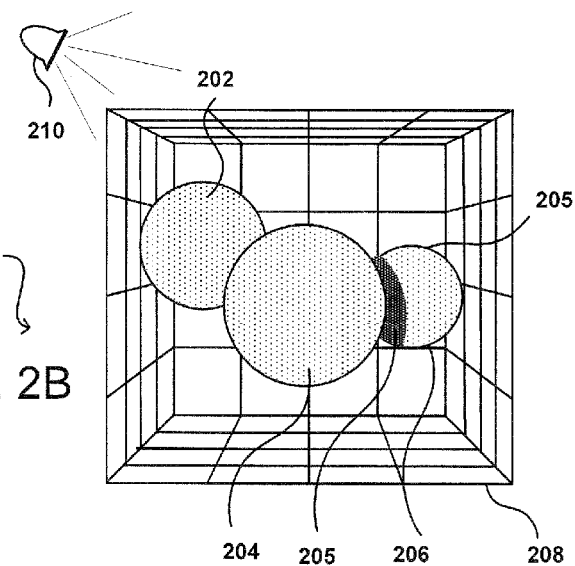
Figure 2C:
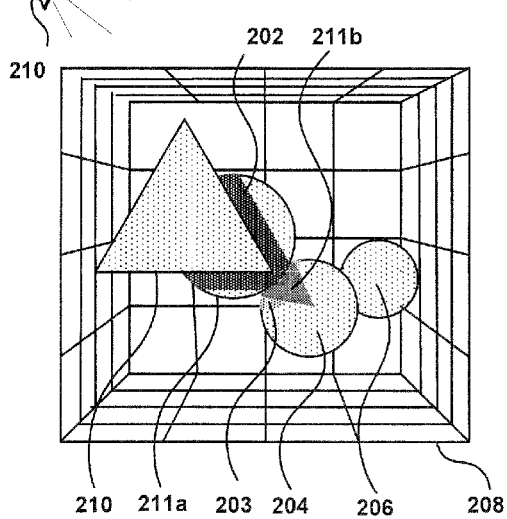

FIGS. 2A-2C illustrate an example approach of dynamically modifying the depths of UI elements in accordance with an embodiment. In FIG. 2A, an example 200 of a user interface similar to that of FIGS. 1C, 1F, and 1I is shown. The user interface includes three UI elements 202, 204, and 206 displayed within a 3D grid 208. Each of the UI elements 202, 204, 206 would normally appear to be similar in size and shape but have been transformed according to at least a scale to give a user an impression of depth. In particular, UI element 202 corresponds to a depth closest to the user and a largest scale, UI element 204 corresponds to an intermediate depth and an intermediate scale, and UI element 206 corresponds to depth furthest away from the user and a smallest scale. As mentioned, other transformations can also be applied to simulate 3D depth, such as rotations, translations, perspective projections, among other possibilities. In this example, UI element 202 can be seen overlapping an upper left portion of UI element 204, and UI element 204 can be seen overlapping a lower left portion of UI element 206. A fixed virtual light source 210 may be positioned off-screen at the upper left corner of the grid 208 such that UI element 202 casts a shadow 203 upon UI element 204. However, UI element 204 does not cast a shadow on UI element 206 because UI element 204 is positioned lower horizontally than UI element 206.

FIG. 2B illustrates an example 220 of the user interface after the user has interacted with the UI or the UI has otherwise received other input to change the state of each UI element. For instance, the UI elements could correspond to a portion of an alphanumeric keypad that uses depth cues for suggesting the most likely next key for the user to enter. After the user enters a portion of a text or a number, the device may present the next alphanumeric or numeric key corresponding to a text suggestion or number suggestion that the user is most likely attempting to enter into the computing device. The device can emphasize the next key by displaying the key at a depth closest to the user, and the device can de-emphasize other keys by positioning the other keys at depths further away from the user. Thus, in this example, UI element 204 is brought to a depth closest to the user and UT element 202 is pushed down to a lower depth. This is shown by the scale of UI element 204 being increased to the largest scale and the scale of UI element 202 being decreased to an intermediate scale. To further enhance an impression of depth of the UI, the transformations of UI elements 202 and 204 also result in UI element 204 casting a shadow 205 on UI element 206, and UI element 202 no longer casting a shadow on UI element 204.

FIG. 2C illustrates an example 240 of the user interface after the user has interacted with the UI or the UI has otherwise received other input to change the state of the UI. In this example, UI elements 202, 204, and 206 may represent components of one or more first executing user applications. The user may start up a second user application that includes UI element 210. The second user application may then obtain focus as depicted in UI element 210 being displayed at the depth perceived to be closest to the user. UI element 202, 204, and 206 can be pushed to a lower depth, which can be depicted by scaling the elements to a smaller scale and diffusing the intensity of shadows at lower depths. For example, the shadow 211a cast by UI element 210 on UI element 202 appears darker than the shadow 203 cast by UI element 202 on UI element 204 because of the relative depths of UI elements 202, 204, and 210. In this example, UI element 210 may also cast a shadow 211b on UI element 204, but at a different offset, shadow-casting angle, and/or intensity than the shadow cast on UI element 202 because of the differences in the depths of UI elements 210, 202, and 204. In particular, shadow 211b can be seen at a different offset and angle from shadow 211a, and shadow 211b is slightly darker than shadow 203. In some embodiments, the merger of shadows, can also cause the merged portion to appear more intense than it would otherwise if the shadows do not merge.

In various embodiments, a UI framework can be enhanced to manage 3D depths of each of the UI elements of the framework via a 3D layout container or 3D depth manager. The 3D depth manager may be associated with a virtual light source having properties as discussed elsewhere herein that can be configured by a user. In at least some embodiments, the 3D depth manager can also be adapted to be associated with multiple light sources by a device or a user of the device. Further, the 3D depth manager can be responsible for managing shadows of UI elements and optimizing drawing or rendering of the shadows. For example, a UI element that is to cast a shadow and/or receive a shadow can enable such functionality by registering itself with the 3D depth manager. The 3D depth manager can maintain state information for each depth that includes the position and dimensions of the UI elements at the depth and shadows that may be cast at that depth. When a UI element registers with the 3D depth manager, the 3D depth of the UI element can be obtained. If the UI element's 3D depth is not associated with any existing state information, the state information can be updated with the new depth and the position and dimensions of the UI element at the new depth. In some embodiments, the position and dimensions of a UI element may be defined by a rectangular area at the depth that bounds the UI element. The 3D depth manager can determine whether any UI elements at higher depths can cast shadows at the new depth and update the state information with the new shadows for the new depth accordingly. The 3D depth manager may also remove shadow pairings that may no longer be applicable as a result of introducing the new depth. Further, the 3D depth manager may determine whether the UI element can cast shadows on any UI elements at lower depths and likewise update the state information for the lower depths. In some embodiments, the position and dimensions of a shadow can depend on the position and dimensions of a corresponding UI element (e.g., "shadow caster") and the properties of the virtual light source (s). For example, the position and dimensions of the shadow can include an x-y offset from the shadow casting UI element, a depth of the shadow-casting UI element, and the position and dimensions of other UI elements (e.g., "shadow receivers"). In one embodiment, the dimensions of the shadow (e.g., width and height) can be similar or substantially similar to the dimensions of the corresponding shadow-casting UI element. In some embodiments, the shadows may depend upon the opacity of the shadow-casting UI element. For example, a UT element may comprise text and the shadow cast by such a UI element would only include portions of the UI element that are opaque.

In various embodiments, the 3D depth manager may use one or more k-dimensional (k-d) trees, binary space partitioning (BSP) trees, quadtrees, octrees, or variations thereof for quickly determining any collisions between UI elements and shadows at each depth. That is, these various algorithms can be used to determine where a shadow intersects with a UI element (e.g., where the shadow overlays the shadow receiving UI element). For instance, a quadtree is a data structure that can be used to represent a 2D region, such as a 2D region corresponding to a 2D display screen or other display element. The quadtree is formed by iteratively decomposing a region into four equal quadrants such that each leaf node contains data corresponding to a specific sub-region. A quadtree with a depth of n may be used to represent an image consisting of 2"×2" pixels. A quadtree begins with a root node that can represent the entire 2D region. As objects, such as UI elements, are added to the quadtree, a node will be split into four nodes and each object (e.g., UI element) can be inserted into one of the sub-nodes according to where it lies in 2D space. Quadtrees can be used to quickly detect collisions by determining whether a first object (e.g., UI element) intersects with another object (e.g., UI element). That is, a determination can be made whether the boundaries of the first object overlap with the boundaries of a second object. In one embodiment, a 3D depth manager can maintain a pair of quadtrees, one for UI elements and another for shadows, for each distinct depth of a user interface. If a first portion of a first UI element is covered by a second portion of a second UI element or shadow, the first portion does not need to be redrawn or rendered. Such an approach can be used to optimize rendering by reducing or minimizing overdrawing of portions of first UI elements and/or shadows that may be positioned beneath second UI elements and/or shadows at depths above the first UI elements and/or shadows.

Octrees may function similarly to quadtrees except that each node of an octree has exactly eight children or zero children (e.g., leaf nodes) and can be used to represent 3D space. A BSP tree is a generalization of quadtrees and octrees, but one in which the hyperplanes that partition space may have any orientation rather than being axis-aligned. BSP trees can be used to contain more complexly bound objects (e.g., UI elements), such as polygons. A k-d tree is a special case of a BSP tree in which every node is a k-dimensional point. Every non-leaf node generates a splitting hyper plane that divides space into two parts or half-spaces. Points to the left of the hyperplane can be represented by the left subtree and points right of the hyperplane can be represented by the right subtree.

The 3D depth manager can also manage state information when a UI element changes depth. The 3D depth manager can remove the UI element at its previous depth, update the position and dimensions of the UI element at its new depth, update or remove the shadows previously cast by the UI element, update or remove shadows previously received by the UI element, update or add shadows that are cast by the UI element at depths below the new depth, and add shadows received to the UI element at depths above the new depth. As mentioned, one or more k-d trees, BSP trees, quadtrees, octrees can be used to quickly facilitate collision detection (e.g., intersection or overlap) between UI elements and shadows at various depths.

Figure 3A:
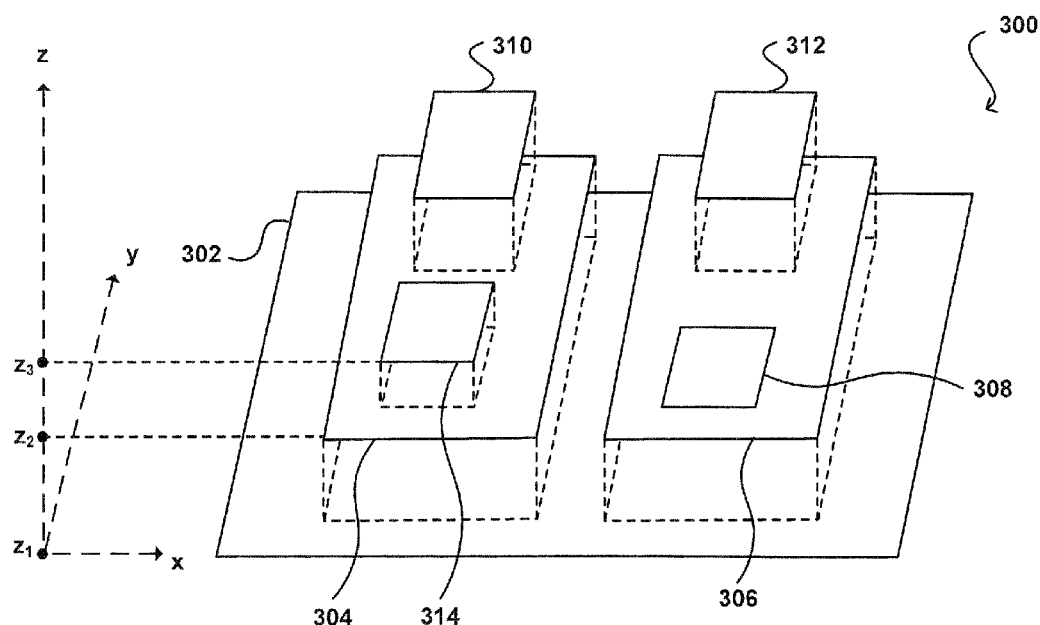
FIGS. 3A-3E illustrate an example user interface that simulates depth in accordance with an embodiment.

FIG. 3A illustrates an example 300 of a user interface displayed based upon a first viewing angle of a user in accordance with an embodiment. The example UI includes multiple user interface elements arranged at various depths. In particular, the UI elements are arranged according to three different depths, $z_0$, $z_1$, and $z_2$. At the lowest depth $z_0$ or the depth appearing to be furthest away from a user (and/or the display screen) is UI element 302. At the intermediate depth $z_1$ are UI elements 304, 306, and 308. UI element 308 is contained within UI element 306. At the highest depth $z_2$ or the depth appearing to be closest to a user (and/or the display screen) are UI elements 310, 312, and 314. In this example, UI elements 304 and 306 can be thought of as the "children" of UI element 302, UI elements 310 and 314 can be characterized as the children of UI element 304, and UI elements 308 and 312 are the children of UI element 306. UI elements 308, 310, 312, and 314 can be thought of as the "grandchildren" of UI element 302. Thus, UI elements 302, 304, 306, 308, 310, 312, and 314 can be represented as a UI hierarchy with UI element 302 as a root of the hierarchy, UI elements 304 and 306 as branches of the root, and UI elements 308, 310, 312, and 314 as leaves of the hierarchy, with UI elements 310 and 314 branching from UI element 304 and UI elements 308 and 312 branching from UI element 306. It will be appreciated by those of ordinary skill in the art that a user interface could have fewer or greater depths and/or fewer or greater UI elements than are illustrated in FIG. 3A. Thus, the depiction of the user interface 300 in FIG. 3A should be taken as being illustrative in nature and not limiting to the scope of the disclosure.

In various embodiments, each of the UI elements can be associated with presentation information such as a position and dimensions, including for example, x, y, and z coordinates defining an origin and a width and height for a planar UI element, x, y, and z coordinates defining the origin and a width, height, and depth for a rectangular cuboid UI element, or x, y, and z coordinates of vertices of a complex 3D UI element. It will be appreciated that UI elements can be represented as other primitive 2D or 3D geometric shapes, such as circles, triangles, polygons, spheres, pyramids, prisms, among others, or custom shapes defined by their vertices in other embodiments. The position and dimensions of each UI element can be used by a computing device to measure, layout, and/or draw the UI element based on the position of the face or head or user with respect to the computing device and/or the motion/orientation of the device to give the user an impression that he is interacting with the UI element in an environment having 3D depth. In addition, the position and dimensions of the UI element can be used to cast shadows based on an intersection of light from a virtual light source with the UI element to further enhance simulated 3D depth.

Figure 3B:
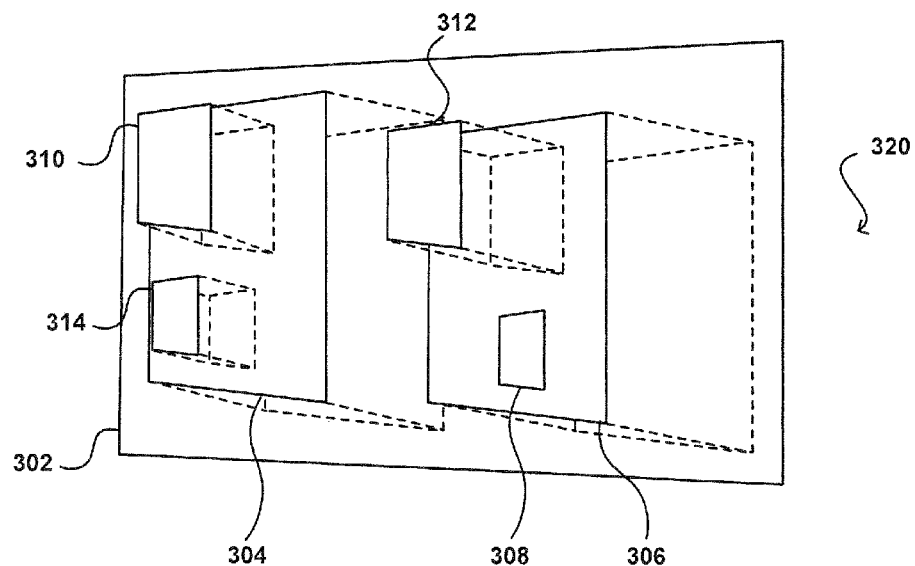

FIG. 3B illustrates an example 320 of the user interface at a second viewing angle of the user. In this example, the user has rotated the computing device laterally to the left (e.g., leftward along the y-axis). Such user interaction or input event may be monitored via an "event listener" associated with one or more of the UI elements. Upon detection of the input event, a callback function of the event listener may be invoked to cause the UI hierarchy to be redrawn or rendered to correspond to a new viewing angle of the user. In this example, UI elements 302, 304, 306, 308, 310, 312, and 314 can each be transformed according to a rotation, scale, translation, perspective projection, among other possibilities, based on the new viewing angle of the user so as to give the appearance that the UI elements exist in an environment having 3D depth. This can be demonstrated by the transformation of UI element 312, which can now be seen partially obscuring a portion of UI element 302 beneath UI element 304 which had not previously been obscured. Approaches for transforming one or more UI elements according to the viewing angle of the user are discussed in U.S. patent application Ser. No. 14/040,357, entitled "Simulating Three-Dimensional Views Using Planes of Content," filed on Sep. 27, 2013, which is incorporated herein by reference.

Figure 3C:
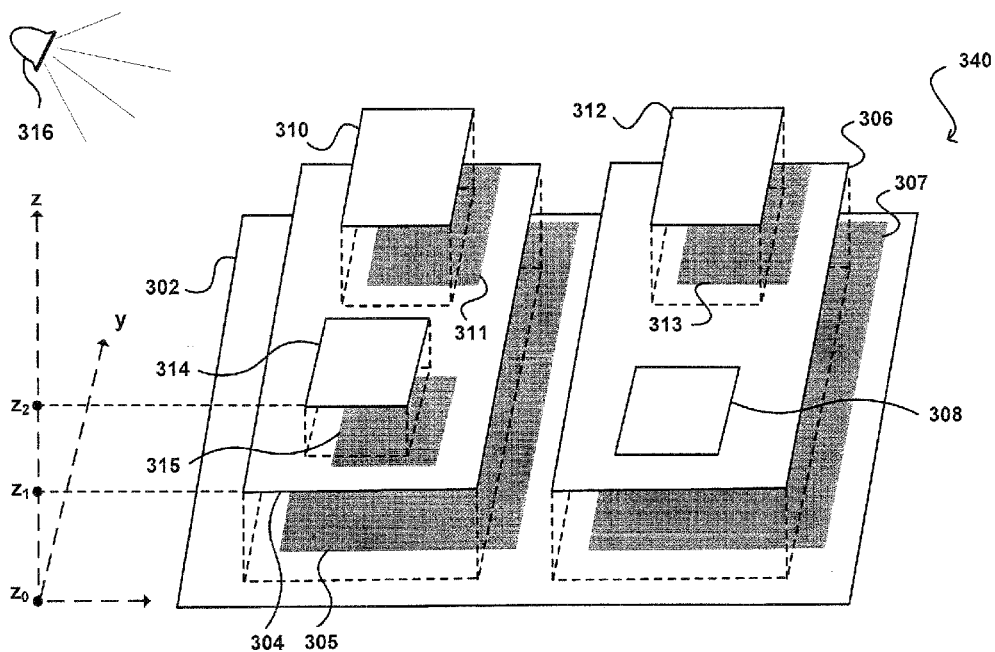

As mentioned, to further enhance an impression that a UI environment is associated with 3D depth, one or more UI elements can each be configured to cast a shadow based on the position and dimensions of the UI element, the properties of a virtual light source, and the position and dimensions of other UI elements upon which the shadow may be cast. FIG. 3C illustrates an example 340 of the user interface in which multiple UI elements have been configured to receive and/or cast shadows in accordance with an embodiment. In this example, a virtual light source 316 may be located off-screen at the upper left corner of a display screen presenting the UI. At the highest depth $z_3$, UI elements 310 and 314 each cast a shadow 311 and 315, respectively, on their parent, UI element 304. Further, UI element 312 casts a shadow 313 on its parent, UI element 306. At the intermediate depth $z_2$, UI element 308 does not cast a shadow on its parent because it is positioned flush (e.g., at the same depth) with respect to its parent, UI element 306. UI elements 304 and 306, however, each cast a shadow 305 and 307, respectively, on their parent, UI element 302. In this example, UI elements 302, 304, and 306 are shadow receivers as shadows are casted upon them by their children. UI elements 304, 306, 310, 312, and 314 are shadow casters as they cast shadows upon their parents. As can be seen with UI elements 304 and 306, a UI element can be both a shadow caster and a shadow receiver.

Figure 3D:
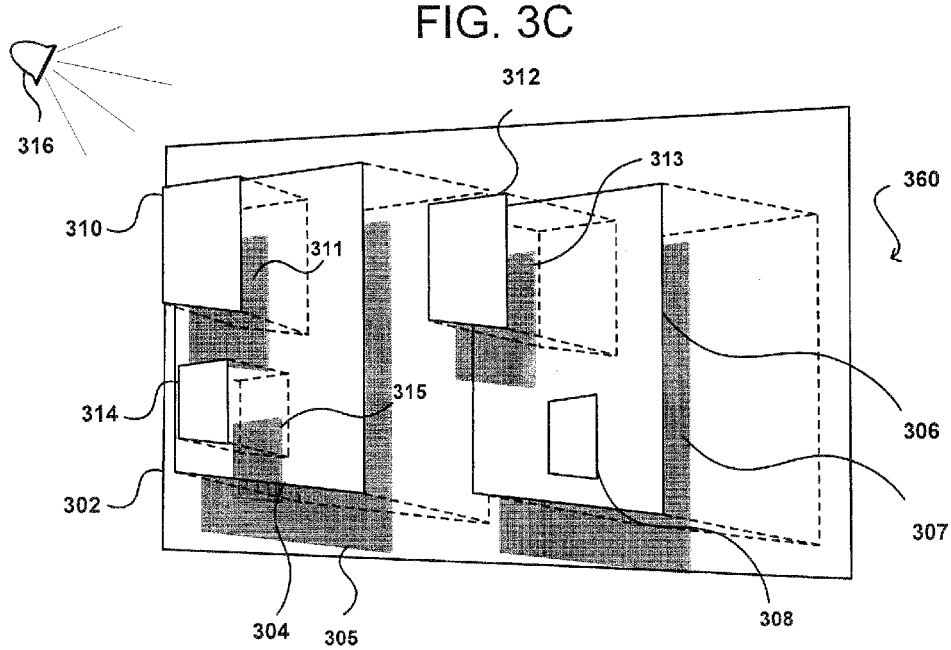

As the position of the user relative to the device and/or the motion/orientation of the device changes, transformations (e.g., rotation, scale, translation, perspective projection, etc.) can be applied to the UI elements to account for the new viewing angle of the user with respect to the device. Further, shadows can be redrawn or rendered according to the transformations of the UI elements and the properties of the virtual light source. FIG. 3D illustrates an example 360 of the user interface wherein the UI elements have been transformed based upon the new viewing angle of the user and shadows have been recast according to the dimensions of the transformed UI elements and the properties of the virtual light source. In this example, as the UI elements 302, 304, 306, 308, 310, 312, and 314 are transformed based upon the new viewing angle of the user, the respective shadows for shadow casting UI elements 304, 306, 310, 312, and 314 can also be redrawn or rendered to conform to the transformations of these elements' parents and/or the position and other characteristics of the virtual light source. The ability to recast shadows in a realistic manner can enhance the user's interactions with a user interface such as by providing cues as to how the user's behavior may affect the operation of a computing device.

Figure 3E:
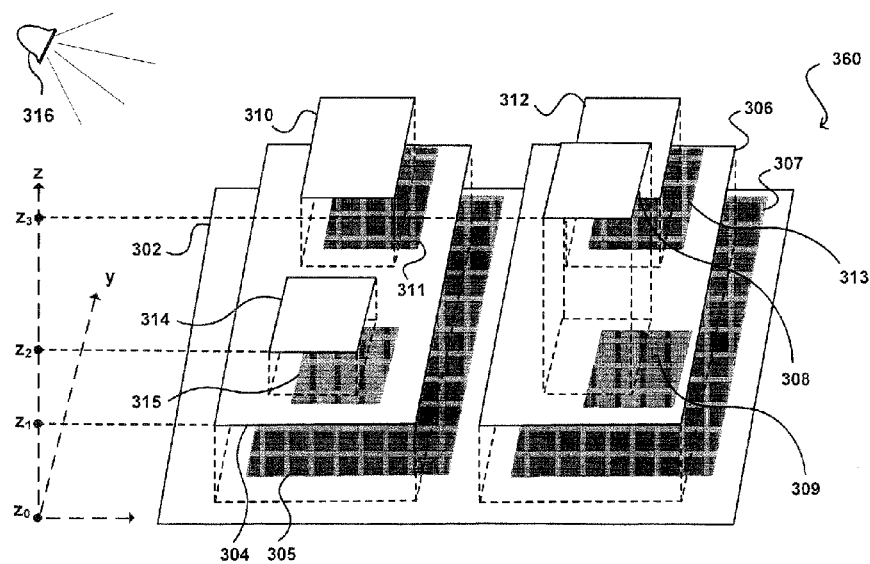

FIG. 3E illustrates an example 380 of the user interface in which the depth of UI element 308 changes as a result of a user interacting with the UI or the UI otherwise receiving another input to change the state of the UI element. For example, the UI may be a product catalog displaying product information in a grid layout. UI element 308, as seen in FIG. 3A, may have initially been de-emphasized because there was no inventory for the product associated with UI element 308. In FIG. 3E, the inventory for the product associated with UI element 308 may be replenished. Further, there may be a sale for the product such that the depth of UI element 308 is elevated from depth $z_1$ to a new depth $z_3$. As mentioned, when there is a new 3D depth established within a UI framework, the UI framework may update state information with the new depth and the dimensions of the UI element positioned at the new depth. In this example, UI element 308 did not previously cast a shadow. However, in other situations where the depth of a UI element has changed and the UI element previously cast shadows, it will be appreciated that the previous shadows can be updated or removed based on the new depth of the UI element. Further, if the UI element previously received shadows, these shadows can also be updated or removed. After the shadows cast or received by the UI element have been updated or removed, the shadows cast and received by the UI element at the new depth can be determined. Here, as a result in the change in the depth of UI element 308, the UI element can be seen casting a shadow 309 on parent UI element. In this example, shadow 309 is offset further to the right than shadows 311, 313, and 315 because its corresponding shadow-caster, UI element 308, is positioned at a higher depth than the corresponding shadow-casters for shadows 311, 313, and 315, UI element 310, 312, and 314, respectively. In other embodiments, the angle of the shadows, intensity, among other parameters, can be used to convey relative depth information.

Figure 4:
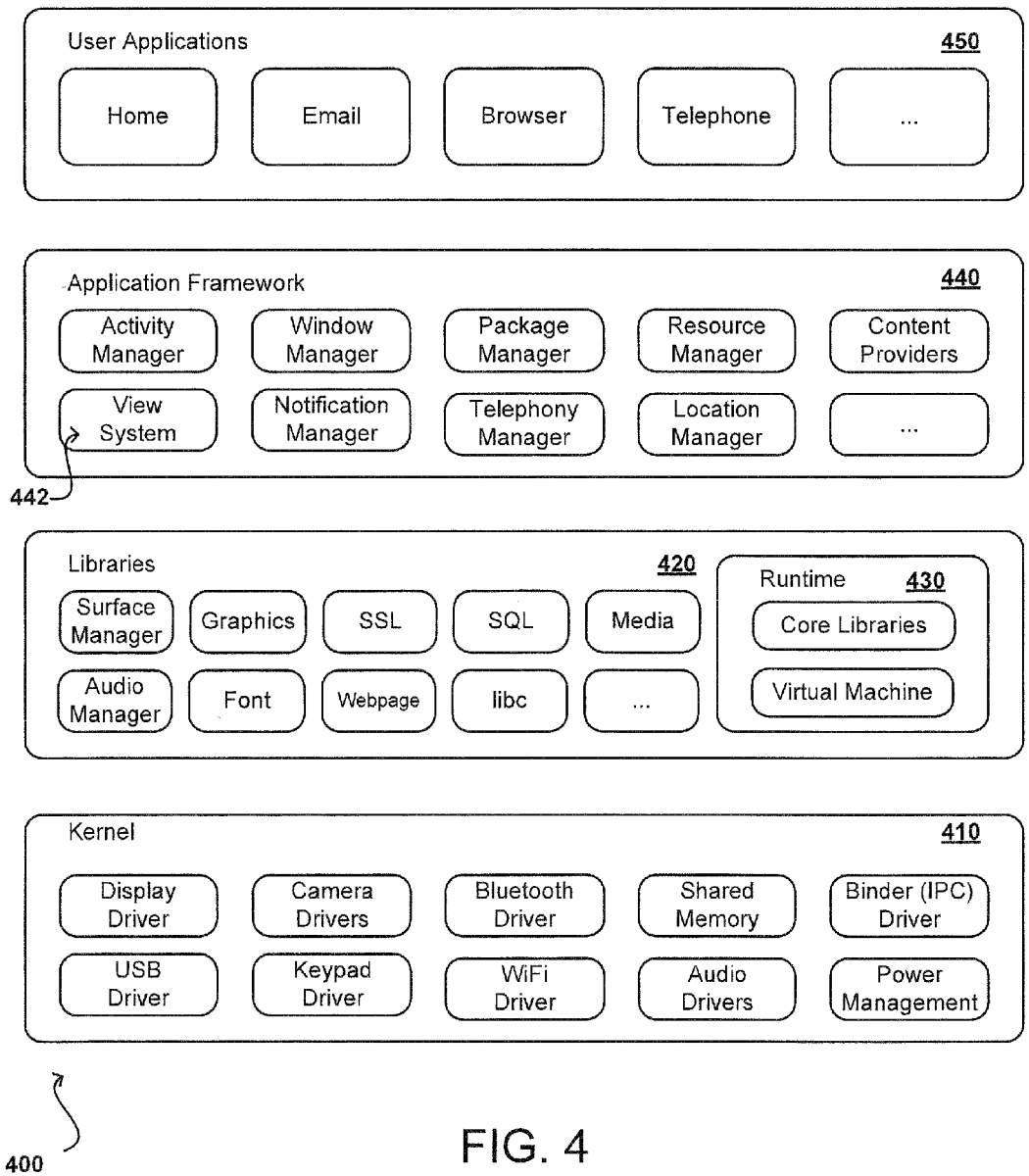
FIG. 4 illustrates an example of an operating system that can be used in accordance with an embodiment.

Approaches in accordance with various embodiments can be implemented in various platforms. FIG. 4 illustrates an example architecture of an operating system 400 for a computing device that can be used in accordance with an embodiment. Operating system 400 may be based on the open-source Android® platform (e.g., version 3.0 or later), but it will be appreciated that other platforms can be utilized in various embodiments, such as iOS®, Windows Phone®, Blackberry®, webOS®, among others. At the bottom of the software stack 400 resides the kernel 410, which provides a level of abstraction between the hardware of the device and the upper layers of the software stack. In an embodiment, the kernel 410 may be based on the open-source Linux® kernel. The kernel 410 may be responsible for providing low level system services such as the driver model, memory management, process management, power management, networking, security, support for shared libraries, logging, among others.

The next layer in the software stack 400 is the system libraries layer 420 which can provide support for functionality such as windowing (e.g., Surface Manager) 422, 2D and 3D graphics rendering 424, Secure Sockets Layer (SSL) communication, SQL database management, audio and video playback, font rendering, webpage rendering, System C libraries, among others. In an embodiment, system source libraries layer 420 can comprise open source libraries such as the Skia Graphics Library (SGL) (e.g., 2D graphics rendering), Open Graphics Library (OpenGL®) (e.g., 3D graphics rendering), Open SSL (e.g., SSL communication), SQLite (e.g., SQL database management), Free Type (e.g., font rendering), WebKit (e.g., webpage rendering), libc (e.g., System C libraries), among others. Thus, dependencies are established between higher levels of the software stack of operating system 200 and these system libraries.

Located on the same level as the system libraries layer is the runtime layer 430, which can include core libraries and the virtual machine engine. In an embodiment, the virtual machine engine may be based on Dalvik®. The virtual machine engine provides a multi-tasking execution environment that allows for multiple processes to execute concurrently. Each application running on the device is executed as an instance of a Dalvik® virtual machine. To execute within a Dalvik® virtual machine, application code is translated from Java® class files (.class, .jar) to Dalvik® bytecode (.dex). The core libraries provide for interoperability between Java® and the Dalvik® virtual machine, and expose the core APIs for Java®, including data structures, utilities, file access, network access, graphics, among others.

The application framework 440 comprises a set of services through which user applications interact. These services manage the basic functions of a computing device, such as resource management, voice call management, data sharing, among others. The Activity Manager controls the activity life cycle of user applications. The Package Manager enables user applications to determine information about other user applications currently installed on a device. The Window Manager is responsible for organizing contents of a display screen. The Resource Manager provides access to various types of resources utilized by user application, such as strings and user interface layouts. Content Providers allow user applications to publish and share data with other user applications. The View System 442 is an extensible set of UI elements or "views" used to create user interfaces for user applications. The Notification Manager allows for user applications to display alerts and notifications to end users. The Telephony Manager manages voice calls. The Location Manager provides for location management, such as by GPS or cellular network. Other hardware managers in the application framework 440 include the Bluetooth Manager, WiFi Manager, USB Manager, Sensor Manager, among others.

Located at the top of the software stack 400 are user applications 450, such as a home screen application, email application, web browser, telephony application, among others.

Figure 5:
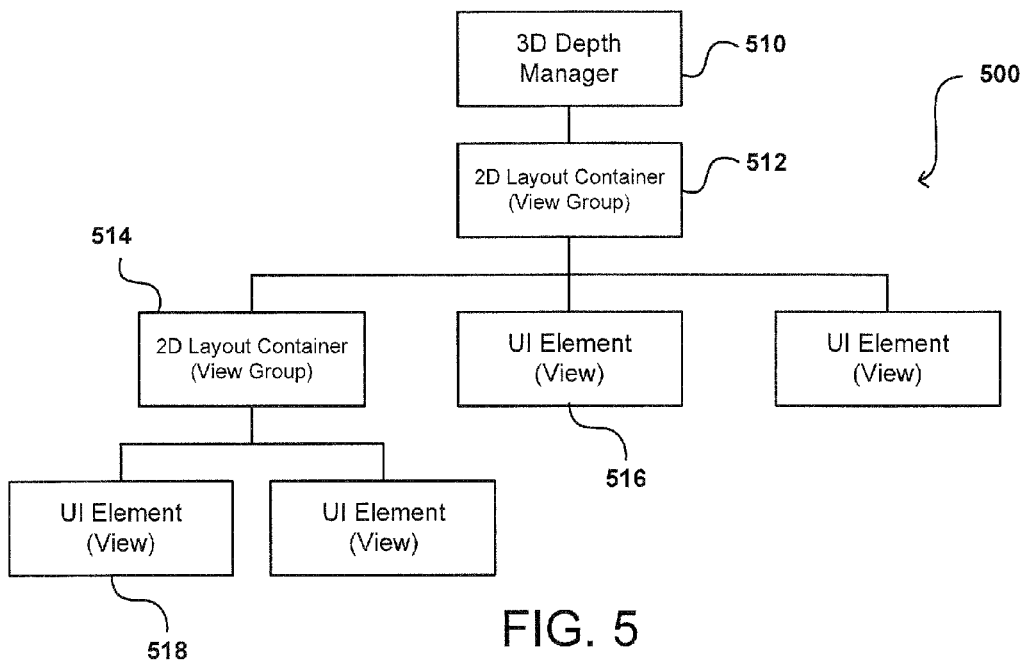
FIG. 5 illustrates example components of a user interface framework of an operating system, such as that illustrated in FIG. 4, that can be used in accordance with an embodiment.

A user interface framework, referred to as a "view system" in the example operating system 400 of FIG. 4, can provide a manner for presenting data to a user (e.g., graphics, text, and audio) and the means for the user to interact with that data (e.g., key presses such as via a keyboard or buttons, virtual pointer gestures such as via a mouse or trackpad, physical pointer gestures such as via touch or a stylus, device motion gestures, facial movement or gestures, hand gestures, among others). In various embodiments, a basic building block of a UI framework is a UI element (referred to as a "view" in the example operating system 400 of FIG. 4). A UI element or view can occupy a rectangular (or rectangular cuboid) area of a display screen, and can be responsible for drawing and event handling. An example of a UI element or view can include a text field, image, button, among others. UI elements or views may be arranged for display on the display screen by placing them within 3D layout containers (e.g., "depth containers") or 2D layout containers (e.g., referred to as "view groups" in the example operating system 400 of FIG. 4). FIG. 5 illustrates an example of a user interface hierarchy or view hierarchy 500 that can be used in accordance with an embodiment. At the root of the UI or view hierarchy 500, there may be a 3D layout container or depth container 510 that sets forth how its children are to be arranged according to depth and managers other depth properties. Within a depth container, there may be at least one 2D layout container 512. Examples of 2D layouts can include frame layouts, linear layouts, relative positioning layouts, grid-based layouts, among others. Two-dimensional layout containers can include one or more child 2D layout containers, such as layout container or view group 514 and one or more UI elements or views, such as UI element or view 516. Two-dimensional child layout containers can include one or more of their own child layout containers (not shown) and one or more of UI elements, such as UI element or view 518. In other embodiments, a 3D layout container can provide 3D and 2D layout functionality such that the 3D layout container does not need to incorporate 2D layout containers or view groups, and/or 3D layout containers can extend from 2D layout containers with additional capabilities for managing 3D depth. In some embodiments, a UI or view hierarchy can be defined declaratively in a language such as XML and/or programmatically in a language such as Java®. An advantage of such an approach can enable the "look" of an application to be designed without particularized knowledge of software programming.

Figure 6:
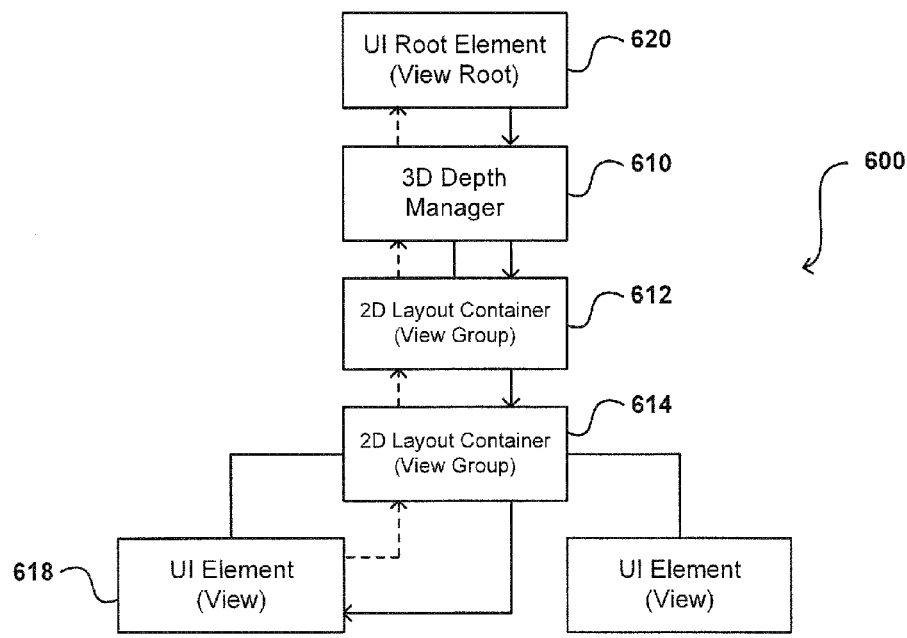
FIG. 6 illustrates an example process for maintaining states of user interface elements of a user interface framework, such as that illustrated in FIG. 5, that can be used in accordance with an embodiment.

Users may interact with a UI element or view, such as by clicking on, touching, or swiping a view, issuing an audio command, shaking a device, among other possibilities. These user interactions are sometimes referred to as input events, and windows or views may be configured to monitor for specific input events via "event listeners." An event listener is an implementation within a UI element or view that contains a callback function. These functions will be invoked by the UI framework or view system for the UI element or view to which the listener has been implemented when triggered by a particular user interaction with the UI element or view. As mentioned, in various embodiments, facial detection and/or device motion detection can also be used to determine a user's position with respect to a computing device and movement of the user's face or head with respect to the device (or movement of the device relative to the user). Such head tracking data can be monitored using cameras, sensors such as accelerometers, gyroscopes, and magnetometers, and other input elements of a computing device as discussed elsewhere herein or incorporated by reference herein. A new relative position of the user or viewing angle of the user with respect to the computing device can then be recognized as an input event. When a UI element or view is drawn for the first time or needs to be redrawn or rendered in response to an input event, such as a new relative position or viewing angle of the user, the UI framework or view system first traverses the UI or view hierarchy to measure and layout the UI elements or views according to the appropriate size and position of the views before drawing them. FIG. 6 illustrates an example process 600 that can be used in accordance with an embodiment. In the UI framework or view system, drawing can be initiated by a call to "invalidate" a UI element or view or mark the UI element or view as "dirty," such as in response to the input event. For instance, user interaction with a UI element or view may cause a change to the UI element or view. Pressing a virtual button may change the color of the button, cause the button to appear to be depressed, cause a menu or new window to be displayed, etc. As a result, the button may have to be redrawn or rendered. To the extent the button also causes a menu or new window to be displayed, the portion of the display screen where the menu or new window will be displayed also must be redrawn or rendered. In conventional approaches, the entire UI element or view may have to be redrawn or rendered even when only a limited portion of the UI element or view to change in response to user interaction. To optimize drawing of the UI elements, those portions of the UI element or view that need to be redrawn or rendered are "invalidated," marked as "dirty," or otherwise marked as requiring redrawing. In this example, UI element or view 618 has been invalidated or marked as requiring redrawing, which propagates the invalidation or marking message up the UI element or view hierarchy, as indicated by the dashed line, to determine the dirty regions, i.e., those regions of the screen that need to be redrawn. First, the invalidation or marking message is propagated from UI element or view 618 to its parent, 2D layout container or view group 614; then to the parent of 2D layout container or view group 614, 2D layout container or view group 612; then to the parent of 2D layout container or view group 612, 3D layout container or 3D depth manager 620; and finally to the root of the UI or view hierarchy, UI root element or view root 620. In many instances, the UI root element or view root 620 encapsulates the penultimate 3D layout container or 3D depth manager, 2D layout container or view group, or UI element or view but the UI root element or view root includes additional functions that are not implemented by a 3D layout container or 3D depth manager, 2D layout container or view group, or UI element or view. The UI root element or view root 620 then schedules traversals of all of the UI elements or views to measure and layout the UI elements or views appropriately and draw those UI elements or views intersecting with the dirty regions, as indicated by the solid line. A potential disadvantage with this technique is that drawing may require execution of a UI element or view that has not been changed. For example, a user application may invoke invalidate on a button that overlays a more complex UI element or view, such as a map view. Thus, the map view may be redrawn despite no changes occurring to the map view. For a computing device that supports hardware acceleration (e.g., via a GPU), drawing can be optimized by deferring drawing of each UI element or view and storing the draw commands as "display lists." A display list can be thought of as a cache, and a display list item is a cached instance of the output of a drawing command that can be retrieved without having to re-execute all of the code of the drawing command. Further, a display list item can be manipulated by operations such as translation, rotation, scale, perspective projection, transparency change, among others, without first re-executing all of the code of the drawing command. By retrieving a drawing command output from a display list, less code may be executed in the aggregate. In addition, the UI framework or view system can record or update display lists that have been marked dirty, and a UI element or view that has not been invalidated can be retrieved by re-issuing the corresponding display list previously recorded. Thus, in at least some embodiments, updating of user interface can include propagation of invalidation messages through the UI or view hierarchy, recording and updating display lists, and drawing the display lists.

In some embodiments, the draw traversal of a UI or view hierarchy may begin with the UI element at the lowest depth. Referring back to FIG. 3C, UI element 302 may be drawn first because it is at depth $z_0$. In some embodiments, when a UI element is being drawn, the UI element may set a drawing flag indicating that it is currently drawing. After UI element 302 is drawn, shadows cast on UI element 302 can be drawn before any UI elements at the next depth are drawn. Referring back to FIG. 3A, shadows 305 and 307 may be drawn before UI elements 304 and 306 at depth $z_1$ are drawn. After shadows 305 and 307 are drawn, UI elements 304, 306, and 308 may then be drawn. While UI elements 304, 306, and 308 are being drawn, if any UI elements at the next depth $z_2$, such as UI elements 310, 312, or 314 begin to draw, these UI elements will first check the state of its ancestor UI elements (e.g., UI elements 304 and 306). If an ancestor UI element is drawing, a UI element attempting to draw (e.g., one of UI elements 310, 312, or 314) will stop drawing and add itself along with state information to a priority queue based on depth to defer its drawing until a later time. Once all descendants have either been drawn or deferred, a current UI element may reset the drawing flag to indicate that the UI element has completed drawing, and the deferred UI elements can be drawn in depth order. For example, upon completion of the drawing of UI elements 304 and 306, shadows 311 and 315 can be drawn over UI element 304 and UI element 315 can be drawn over UI element 306. Finally, UI elements 310, 312, and 314 can be drawn to complete the process.

Figure 7:
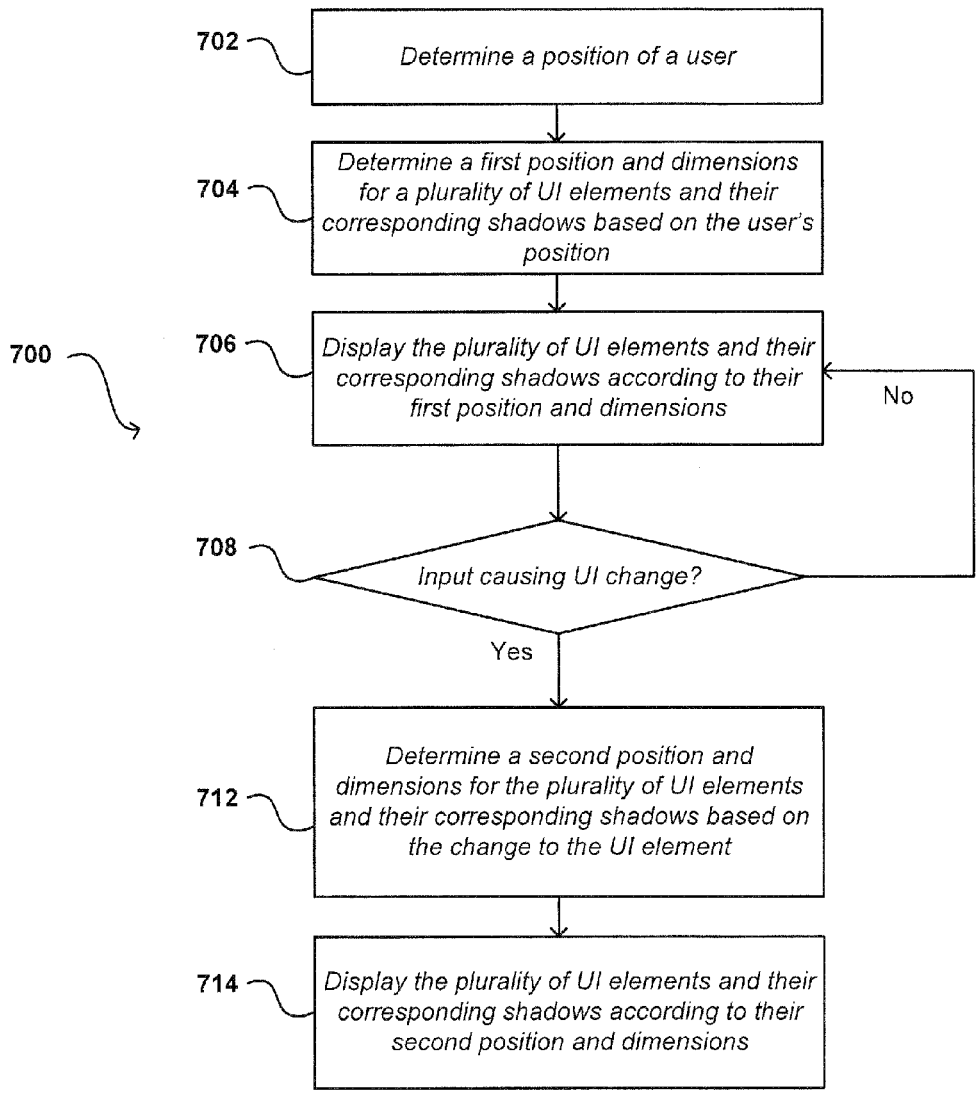
FIG. 7 illustrates an example process for providing a user interface that is based at least in part upon tracking a user's head or face in accordance with an embodiment.

FIG. 7 illustrates an example process 700 for providing a user interface based on tracking of a user's relative position and/or viewing angle in accordance with an embodiment. It should be understood that, for any process discussed herein, there can be additional, fewer, or alternative steps performed in similar or alternative orders, or in parallel, within the scope of the various embodiments unless otherwise stated. The process may be initiated by powering on a computing device such as if the process is performed as part of a home screen application. In other embodiments, a user interface for an application may be based on a user's position or related information such as the user's viewing angle, and the process can be initiated by starting up the application. The process may begin by determining a relative position of the user 702. In some embodiments, the relative position of the user and/or viewing angle can be estimated based on where the representation of the user's head is detected in images captured by one or more cameras. Depending on the application, the relative position of the user can be represented in various ways. In certain embodiments, the relative position can be represented as the raw pixel coordinates of the representation of the user's head detected in the captured image(s). In other embodiments, the relative position of can be computed with respect to the computing device. For example, in one embodiment, a three-dimensional vector can be defined between a first point corresponding to the computing device, such as the center of a display screen of the device, and a second point corresponding to the user's head, such as a point between the user's eyes. Determining the relative position user can include computing the values of this vector as the user's head, face, and/or eyes move with respect to the device (or the device is moved with respect to the user).

In still other embodiments, more robust position information can be estimated by analyzing multiple images from multiple cameras captured at the same time or substantially at the same time in a process referred to as reconstruction. When there are two images or a stereo pair of images, the reconstruction process may include finding a plurality of corresponding points between two images, determining the fundamental matrix from the corresponding points, determining the camera matrices from the fundamental matrix, triangulation of the 3D points that project to the corresponding 2D points in the two images, and rectifying the projective reconstruction to metric. Variations on this approach are possible, such as where the cameras are calibrated. Approaches for camera calibration include the direct linear transformation (DLT) method, or the algorithm set forth in Tsai, Roger. "A versatile camera calibration technique for high-accuracy 3D machine vision metrology using off-the-shelf TV cameras and lenses." *Robotics and Automation, IEEE Journal of* 3, no. 4 (1987): 323-344, or the algorithm set forth in Zhang, Zhengyou. "A flexible new technique for camera calibration." *Pattern Analysis and Machine Intelligence, IEEE Transactions on* 22, no. 11 (2000): 1330-1334, each of which is incorporated herein by reference. In the case where the cameras are calibrated, the essential matrix can be computed instead of the fundamental matrix, and determining the camera matrices may be unnecessary.

Finding corresponding points between two images involves feature matching, which is discussed elsewhere herein or incorporated elsewhere herein. The fundamental matrix is a mapping from the two-dimensional projective plane of the first image to the pencil of epipolar lines corresponding to the second image. Approaches for determining the fundamental matrix include the seven-point correspondences algorithm, the normalized eight-point algorithm, the algebraic minimization algorithm, minimization of epipolar distance, minimization of symmetric epipolar distance, the maximum likelihood (Gold Standard) method, random sample consensus (RANSAC), least median of squares, among others. In some embodiments, the essential matrix may be calculated if the camera calibration matrices are known.

Triangulation computes the 3D point that project to each point correspondence between the two images. Approaches for triangulation include linear methods, the optimal triangulation method, among others. Rectifying the projective reconstruction to metric can be implemented directly, such as by computing the homography for five or more ground control points with known Euclidean positions. Another approach for rectifying the projective reconstruction is referred to as the stratified method, which may involve an affine reconstruction and a metric reconstruction.

One of ordinary skill in the art will appreciate that other embodiments may reconstruct 3D points from multiple 2D images, such as approaches based on calculating the trifocal tensor for three images or techniques based on the factorization algorithm or bundle adjustment for n images. These various approaches for reconstruction are discussed in Hartley, Richard et al. *Multiple view geometry in computer vision*. Vol. 2. Cambridge, 2000, which is hereby incorporated herein by reference.

Alternatively, or in addition, other sensors, such as accelerometers, gyroscopes, magnetometers, or some combination thereof, can also be used to estimate the user's relative position. For example, when only motion/orientation sensors are used, it may be assumed that the absolute position of the user's head remains the same or substantially the same when the device is moved or its orientation changed. The motion and/or orientation of the device can be determined from the motion/orientation sensors, and the relative position of the user can be estimated from the data captured by the motion/orientation sensors based on the assumption that the user's absolute position remains the same. In other embodiments, image analysis techniques can be combined with approaches using motion/orientation sensors. These various approaches are discussed elsewhere herein or incorporated by reference herein.

Based on the estimated relative position of the user, the position and dimensions of UI elements and their corresponding shadows can be determined 704. For example, the presentation of a UI element may depend on a particular position of the user. When the user's line of sight is perpendicular or substantially perpendicular to the display screen, the UI can presented in a first manner such as at a first position and a first set of dimensions. When the user's line of sight changes according to predetermined thresholds, such as by a specified number of degrees or distance, the UI element may be rendered to correspond to the new relative position so as to provide the user the impression he is interacting with the UI element in an environment associated with 3D depth. Thus, a transformation comprising at least one of a rotation, scale, translation, or perspective projection can be applied to the UI element from the user's first relative position to the user's second relative position to simulate 3D depth.

After the positions and dimensions for the UI elements and shadows are determined, the UI elements and shadows can be displayed 706 according to the determined positions and dimensions. As the UI framework in accordance with various embodiments simulates 3D depth, some portions of UI elements and shadows may be occluded by UI elements at higher depths. Thus, in some embodiments, a portion of a UI element may be visible when no portion of UI elements having a higher depth intersect that portion, and a portion of a shadow may be visible when the corresponding shadow-casting UI element does not intersect that portion of the shadow and no portion of UI elements having a higher depth than the shadow intersect that portion of the shadow. In some embodiments, shadows may be partially transparent such that portions of the UI element upon which the shadow casts can remain partially visible. In some embodiments, shadows may overlap and overlapping regions may appear to be less transparent or darker than portions of shadows that do not overlap with other shadows.

In certain situations, a UI element may change 708 during the course of operating the computing device. As mentioned, a UI element can be altered by user interactions with the computing device such as touch gestures, voice commands, head gestures, hand gestures, physical button presses, among other user input modalities. This can include, for example, a depth of the UI element being changed or the appearance of the UI element being changed to correspond to a new perspective or viewing angle of the user with respect to the computing device. The UT element can also change based on receiving other types of information, such as data from a remote server or data from the device itself, such as an alarm, a notification, or other application operating on the device. When at least one UT element is altered, the positions and dimensions of other UI elements and the shadows may also be altered to reflect the modification to the altered UI element. Thus, the positions and dimensions for the UI elements and their corresponding shadows can be recalculated 712. In the case of the UI element whose depth has changed, this can involve removing state information for the UI element at its previous depth and inserting the state information for the UI element at its new depth, updating or removing the shadows previously cast by the UI element, updating or removing shadows previously received by the UI element, updating or adding shadows that are cast by the UI element at depths below the new depth, and adding shadows received to the UI element at depths above the new depth. In the case of other UI elements, those UI elements intersecting with the UI element whose depth has changed, at both the previous depth and the new depth, can be invalidated or marked dirty to redraw those elements. After the new positions and dimensions for the UI element and its corresponding shadow and invalidated UI elements and their corresponding shadows have been determined, the UI elements and their corresponding shadows can be displayed according to the new positions and dimensions 714.

Figure 8:
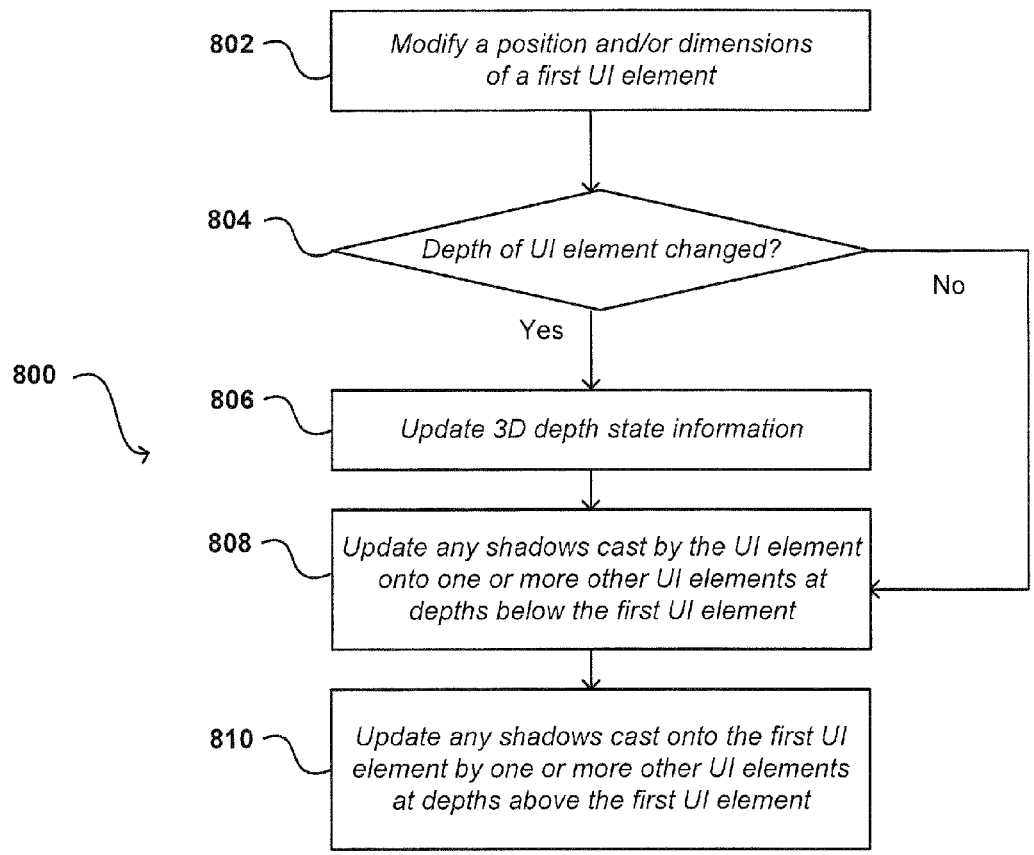
FIG. 8 illustrates an example process for modifying a user interface element and its corresponding based on a user interaction in accordance with an embodiment.

FIG. 8 illustrates an example process 800 for modifying a UI element after a user interaction, such as a user moving his head or tilting the device or otherwise providing an input to the computing device (e.g., touch or touch gesture, audio command, hand or finger gesture, facial gesture, body gesture, etc.), or other input via the UI, such as receiving input data from a remote computing device or other input data from an application or the operating system of the device (e.g., alarms, notifications, among others). The process may begin after it is determined that the position and/or dimensions of a UI element have changed 802 from a previous position and/or dimensions, such as after steps 704 or 712 of FIG. 7. If the depth of the UI element has changed 804, the 3D depth state information is updated 806. Updating the 3D depth state information can include removing the UI element from its previous depth in a 3D depth hierarchy or other data structure. Updating the 3D depth state information can also include inserting the UI element to an existing depth within the 3D depth hierarchy or creating a new depth in the 3D depth hierarchy and inserting the UI element at the new depth. Once the 3D depth state information is updated, the position and/or dimensions of one or more shadows of the UI elements can be determined and updated 808. As mentioned, the position and/or dimensions of the shadows can depend upon properties of a virtual light source and the position and dimensions of the UI element casting the shadow. In one embodiment, the x-y position of a shadow can be represented as an x-y offset from the shadow-casting UI element based on the direction, intensity, and other properties of a virtual light source. In one embodiment, the dimensions of the shadow can be based on the dimensions of the shadow-casting UI element. For example, if the shadow-casting UI element comprises an opaque rectangle, the dimensions of the shadow can match, substantially match, or be proportional to the dimensions of the rectangle (e.g., 90%, 120%, etc.). If the shadow-casting UI element comprises text or incorporates transparent portions, the dimensions of its shadows can correspond to opaque portions of the shadow-casting UI element. Other properties of the shadows can also be determined based on the virtual light source and the position and/or dimensions of the shadow-casting UI element, such as color, intensity, blur amount, transparency amount, among other visual properties, for the shadows. The depth of the shadows are based on the depth of the shadow-casting UI element, the properties of the virtual light source, and the position and dimensions of other UI elements at depths below the shadow-casting UI element. The other UI elements at depths below the shadow-casting UI element, and upon which the shadows of the shadow-casting UI element are cast, can be referred to as shadow receivers or shadow-receiving UI elements. As mentioned, one or more k-d trees, BSP trees, quadtrees, octrees, or similar data structures, can be used to quickly identify where the shadows of the UI element intersect with shadow-receiving UI elements. The shadow state information of the shadow-casting UI element can be updated according to the identified intersections between shadow and shadow receiver. The UI element may also receive shadows from UI elements positioned at depths above the UI element. Thus, the shadows cast upon the UI element can also be updated by detecting collisions or intersections between the UI element and shadows of other UI positioned at depths above the UI element 810, using as a k-d tree, BSP tree, quadtree, octree, or similar data structure.

Figure 9:
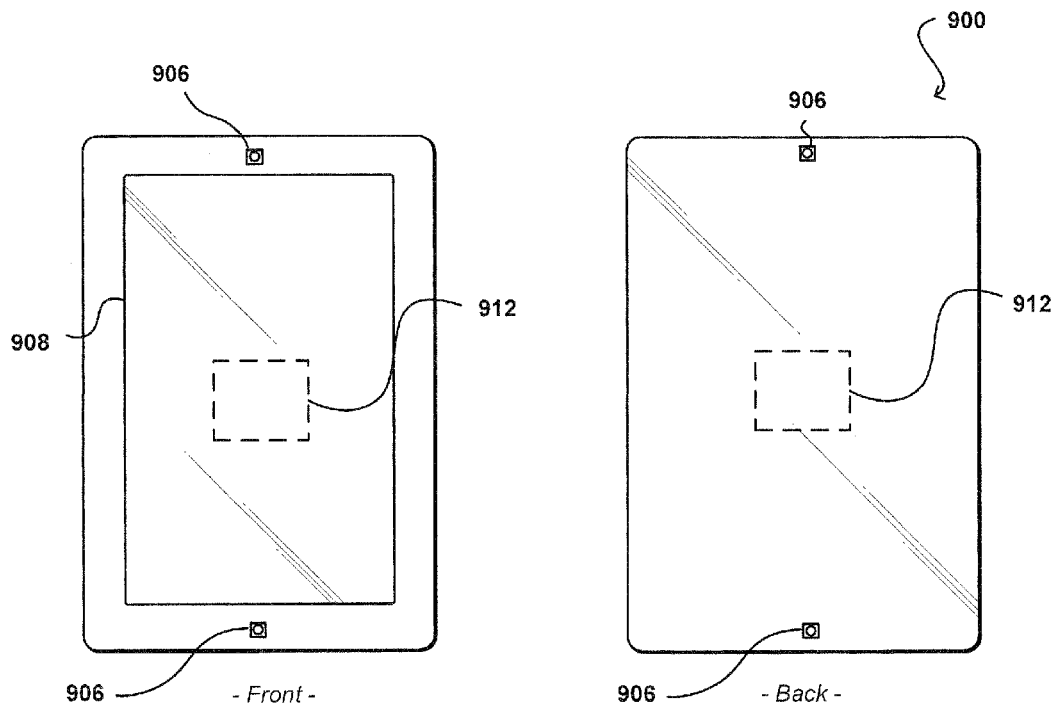
FIG. 9 illustrates an example of a computing device that can be used in accordance with various embodiments.
Figure 10:
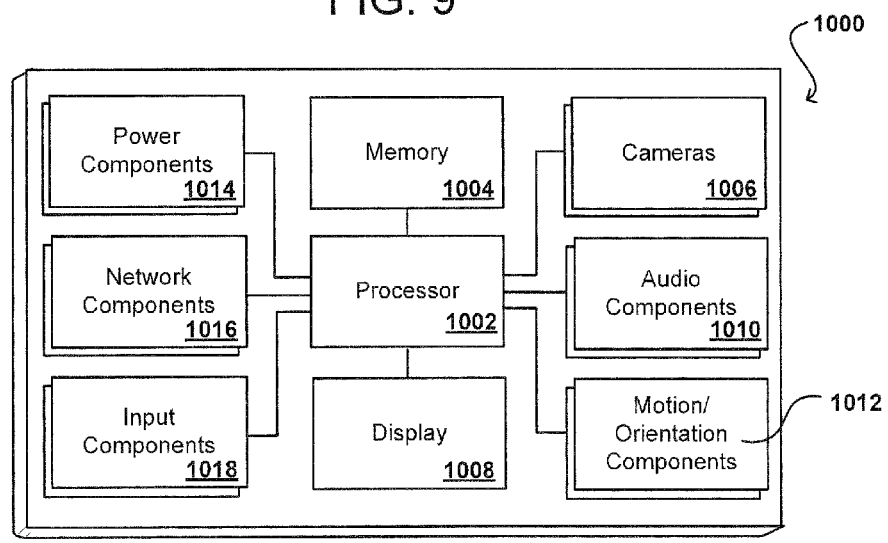
FIG. 10 illustrates an example configuration of components of a computing device such as that illustrated in FIG. 9.

FIG. 9 illustrates an example computing device 900 that can be used to perform approaches described in accordance with various embodiments. In this example, the device includes two cameras 906 located at the top and bottom on each of a same and opposite side of the device as a display element 908, and enabling the device to capture images in accordance with various embodiments. The computing device also includes an inertial measurement unit (IMU) 912, comprising a three-axis gyroscope, three-axis accelerometer, and magnetometer that can be used to detect the motion and/or orientation of the device, and to facilitate head or face tracking in accordance with various embodiments.

FIG. 1000 illustrates a logical arrangement of a set of general components of an example computing device 1000 such as the device 800 described with respect to FIG. 8. In this example, the device includes a processor 1002 for executing instructions that can be stored in a memory component 1004. As would be apparent to one of ordinary skill in the art, the memory component can include many types of memory, data storage, or non-transitory computer-readable storage media, such as a first data storage for program instructions for execution by the processor 1002, a separate storage for images or data, a removable memory for sharing information with other devices, etc. The device typically will include some type of display element 1008, such as a touchscreen, electronic ink (e-ink), organic light emitting diode (OLED), liquid crystal display (LCD), etc., although devices such as portable media players might convey information via other means, such as through audio speakers. In at least some embodiments, the display screen provides for touch or swipe-based input using, for example, capacitive or resistive touch technology. As discussed, the device in many embodiments will include one or more cameras or image sensors 906 for capturing image or video content. A camera can include, or be based at least in part upon any appropriate technology, such as a CCD or CMOS image sensor having a sufficient resolution, focal range, viewable area, to capture an image of the user when the user is operating the device. An image sensor can include a camera or infrared sensor that is able to image projected images or other objects in the vicinity of the device. Methods for capturing images or video using a camera with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device. The example device can similarly include at least one audio component, such as a mono or stereo microphone or microphone array, operable to capture audio information from at least one primary direction. A microphone can be a uni- or omni-directional microphone as known for such devices.

The computing device 1000 includes at least one capacitive component or other proximity sensor, which can be part of, or separate from, the display assembly. In at least some embodiments the proximity sensor can take the form of a capacitive touch sensor capable of detecting the proximity of a finger or other such object as discussed herein. The computing device also includes various power components 1014 known in the art for providing power to a computing device, which can include capacitive charging elements for use with a power pad or similar device. The computing device can include one or more communication elements or networking sub-systems 1016, such as a Wi-Fi, Bluetooth, RF, wired, or wireless communication system. The device in many embodiments can communicate with a network, such as the Internet, and may be able to communicate with other such devices. In some embodiments the device can include at least one additional input element 1018 able to receive conventional input from a user. This conventional input can include, for example, a push button, touch pad, touchscreen, wheel, joystick, keyboard, mouse, keypad, or any other such component or element whereby a user can input a command to the device. In some embodiments, however, such a device might not include any buttons at all, and might be controlled only through a combination of visual and audio commands, such that a user can control the device without having to be in contact with the device.

The device 1000 also can include one or more orientation and/or motion sensors 1012. Such sensor(s) can include an accelerometer or gyroscope operable to detect an orientation and/or change in orientation, or an electronic or digital compass, which can indicate a direction in which the device is determined to be facing. The mechanism(s) also (or alternatively) can include or comprise a global positioning system (GPS) or similar positioning element operable to determine relative coordinates for a position of the computing device, as well as information about relatively large movements of the device. The device can include other elements as well, such as may enable location determinations through triangulation or another such approach. These mechanisms can communicate with the processor 1002, whereby the device can perform any of a number of actions described or suggested herein.

In some embodiments, the device 1000 can include the ability to activate and/or deactivate detection and/or command modes, such as when receiving a command from a user or an application, or retrying to determine an audio input or video input, etc. For example, a device might not attempt to detect or communicate with devices when there is not a user in the room. If a proximity sensor of the device, such as an IR sensor, detects a user entering the room, for instance, the device can activate a detection or control mode such that the device can be ready when needed by the user, but conserve power and resources when a user is not nearby.

In some embodiments, the computing device 1000 may include a light-detecting element that is able to determine whether the device is exposed to ambient light or is in relative or complete darkness. Such an element can be beneficial in a number of ways. For example, the light-detecting element can be used to determine when a user is holding the device up to the user's face (causing the light-detecting element to be substantially shielded from the ambient light), which can trigger an action such as the display element to temporarily shut off (since the user cannot see the display element while holding the device to the user's ear). The light-detecting element could be used in conjunction with information from other elements to adjust the functionality of the device. For example, if the device is unable to detect a user's view location and a user is not holding the device but the device is exposed to ambient light, the device might determine that it has likely been set down by the user and might turn off the display element and disable certain functionality. If the device is unable to detect a user's view location, a user is not holding the device and the device is further not exposed to ambient light, the device might determine that the device has been placed in a bag or other compartment that is likely inaccessible to the user and thus might turn off or disable additional features that might otherwise have been available. In some embodiments, a user must either be looking at the device, holding the device or have the device out in the light in order to activate certain functionality of the device. In other embodiments, the device may include a display element that can operate in different modes, such as reflective (for bright situations) and emissive (for dark situations). Based on the detected light, the device may change modes.

In some embodiments, the device 1000 can disable features for reasons substantially unrelated to power savings. For example, the device can use voice recognition to determine people near the device, such as children, and can disable or enable features, such as Internet access or parental controls, based thereon. Further, the device can analyze recorded noise to attempt to determine an environment, such as whether the device is in a car or on a plane, and that determination can help to decide which features to enable/disable or which actions are taken based upon other inputs. If speech or voice recognition is used, words can be used as input, either directly spoken to the device or indirectly as picked up through conversation. For example, if the device determines that it is in a car, facing the user and detects a word such as "hungry" or "eat," then the device might turn on the display element and display information for nearby restaurants, etc. A user can have the option of turning off voice recording and conversation monitoring for privacy and other such purposes.

In some of the above examples, the actions taken by the device relate to deactivating certain functionality for purposes of reducing power consumption. It should be understood, however, that actions can correspond to other functions that can adjust similar and other potential issues with use of the device. For example, certain functions, such as requesting Web page content, searching for content on a hard drive and opening various applications, can take a certain amount of time to complete. For devices with limited resources, or that have heavy usage, a number of such operations occurring at the same time can cause the device to slow down or even lock up, which can lead to inefficiencies, degrade the user experience and potentially use more power. In order to address at least some of these and other such issues, approaches in accordance with various embodiments can also utilize information such as user gaze direction to activate resources that are likely to be used in order to spread out the need for processing capacity, memory space and other such resources.

In some embodiments, the device can have sufficient processing capability, and the camera and associated image analysis algorithm(s) may be sensitive enough to distinguish between the motion of the device, motion of a user's head, motion of the user's eyes and other such motions, based on the captured images alone. In other embodiments, such as where it may be desirable for an image process to utilize a fairly simple camera and image analysis approach, it can be desirable to include at least one orientation determining element that is able to determine a current orientation of the device. In one example, the one or more orientation and/or motion sensors may comprise a single- or multi-axis accelerometer that is able to detect factors such as three-dimensional position of the device and the magnitude and direction of movement of the device, as well as vibration, shock, etc. Methods for using elements such as accelerometers to determine orientation or movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

When using a camera of the computing device to detect motion of the device and/or user, for example, the computing device can use the background in the images to determine movement. For example, if a user holds the device at a fixed orientation (e.g. distance, angle, etc.) to the user and the user changes orientation to the surrounding environment, analyzing an image of the user alone will not result in detecting a change in an orientation of the device. Rather, in some embodiments, the computing device can still detect movement of the device by recognizing the changes in the background imagery behind the user. So, for example, if an object (e.g., a window, picture, tree, bush, building, car, etc.) moves to the left or right in the image, the device can determine that the device has changed orientation, even though the orientation of the device with respect to the user has not changed. In other embodiments, the device may detect that the user has moved with respect to the device and adjust accordingly. For example, if the user tilts his head to the left or right with respect to the device, the content rendered on the display element may likewise tilt to keep the content in orientation with the user.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

The operating environments can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input component (e.g., a mouse, keyboard, controller, touch-sensitive display element or keypad) and at least one output device (e.g., a display device, printer or speaker). Such a system may also include one or more storage components, such as disk drives, optical storage devices and solid-state storage systems such as random access memory (RAM) or read-only memory (ROM), as well as removable media, memory cards, flash cards, etc.

Such devices can also include a computer-readable storage media reader, a communications component (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage systems or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computing device, comprising:
   one or more processors;
   a display screen;
   memory including instructions that, when executed by the one or more processors, cause the computing device to:
   determine a first position with respect to the display screen and first dimensions for each of a plurality of user interface (UI) elements, the plurality of UI elements corresponding to a plurality of depths, each of the plurality of depths corresponding to one of a plurality of first quadtrees for storing first information relating to the plurality of UI elements and one of a plurality of second quadtrees for storing second information relating to one or more shadows cast by the plurality of UI elements;
   update the plurality of first quadtrees with the first position and the first dimensions of each of the plurality of UI elements;
   for each UI element of the plurality of UI elements that casts a shadow,
   determine first properties of the shadow based at least in part upon a virtual light source for simulating shadow effects, the first position and the first dimensions of the UI element, the first position and the first dimensions of each of the plurality of UI elements that are positioned at a lower depth than the UI element, and whether the shadow intersects one of the plurality of UI elements that are positioned at the lower depth using a first quadtree of each lower depth; and
   update a second quadtree of each lower depth with the first properties of the shadow;
   display, on the display screen, first portions of the plurality of UI elements and first portions of one or more shadows based at least in part upon the plurality of first quadtrees and the plurality of second quadtrees;
   obtain an input corresponding to a modification of one or more of the first position or the first dimensions of at least one of the plurality of UI elements;

determine, based at least in part upon the modification of the first position or the first dimensions of the at least one of the plurality of UI elements, a second position and second dimensions for each of the plurality of UI elements;

for each UI element of the plurality of UI elements having the second position of the UI element differing from the first position of the UI element or the second dimensions of the UI element differing from the first dimensions of the UI element, update one or more of the plurality of first quadtrees with the second position or the second dimensions of the UI element;

determine second properties of the shadow cast by the UI element based at least in part upon the virtual light source, the second position and the second dimensions of the UI element, the second position and the second dimensions of each of the plurality of UI elements that are positioned at the lower depth than the UI element, and whether the shadow intersects one of the plurality of UI elements that are positioned at the lower depth using the first quadtree of each lower depth; and update the second quadtree of each lower depth with the second properties of the shadow; and display, on the display screen, second portions of the plurality of UI elements and second portions of the one or more shadows based at least in part upon the plurality of first quadtrees and the plurality of second quadtrees.

2. The computing device of claim 1, wherein the instructions when executed further cause the computing device to:

for each UI element of the plurality of UI elements having the second position of the UI element differing from the first position of the UI element or the second dimensions of the UI element differing from the first dimensions of the UI element, determine the second properties of each shadow positioned at the depth corresponding to the UI element based at least in part upon the virtual light source, the second position and the second dimensions of each of the plurality of UI elements that are positioned at a higher depth than the depth corresponding to the UI element, and whether each shadow positioned at the depth corresponding to the UI element intersects the UI element using the second quadtree of the depth corresponding to the UI element; and update the second quadtree of the depth corresponding to the UI element with the second properties of each shadow intersecting the UI element.

3. The computing device of claim 1, wherein the input corresponding to the modification of the one or more of the first position or the first dimensions of the at least one of the plurality of UI elements includes at least one of:

one or more images captured by a camera of the computing device, the one or more images used at least in part to estimate a position of the user with respect to the computing device, the modification including a transformation of the at least one of the plurality of UI elements based at least in part upon the position of the user with respect to the computing device;

motion or orientation data captured using at least one of an accelerometer, a gyroscope, or a magnetometer of the computing device, the motion or orientation data used at least in part to estimate the position of the user with respect to the computing device, the modification including the transformation of the at least one of the plurality of UI elements based at least in part upon the position of the user with respect to the computing device;

a user interaction captured by an input element of the computing device, the modification including a change of the depth of the at least one of the plurality of UI elements; or data obtained by the computing device, the modification including the change in the depth of the at least one of the plurality of UI elements.

4. The computing device of claim 1, wherein the instructions when executed to cause the computing device to display the first portions of the plurality of UI elements and the first portions of the one or more shadows or the second portions of the plurality of UI elements and the second portions of the one or more shadows each include causing the computing device to:

determine whether a UI element portion of the first portions or the second portions of the plurality of UI elements intersects an opaque portion of one of the plurality of UI elements that is positioned at the higher depth than the UI element portion using the first quadtree of each higher depth;

render each UI element portion that does not intersect with the opaque portion;

determine whether a shadow portion of the first portions or the second portions of the one or more shadows intersects the opaque portion of one of the plurality of UI elements that is positioned at the higher depth than the shadow portion using the first quadtree of each higher depth;

determine whether the shadow portion intersects one or more of the plurality of UI elements that are positioned at a same depth as the shadow portion using the second quadtree of the depth corresponding to the shadow portion; and render each shadow portion that does not intersect with the opaque portion and intersects the one or more of the plurality of UI elements that are positioned at the same depth as the shadow portion.

5. A computer-implemented method for providing a user interface, comprising:

determining, based at least in part upon a first position and first dimensions of each of a plurality of UI elements, first properties of one or more shadows cast by the plurality of UI elements;

displaying first portions of the plurality of UI elements and first portions of the one or more shadows based at least in part upon the first position and the first dimensions of each of the plurality of UI elements and the first properties of the one or more shadows;

obtaining information corresponding to a modification of the first position or the first dimensions of at least one of the plurality of UI elements;

determining, based at least in part upon the modification of the first position or the first dimensions of the at least one of the plurality of UI elements, a second position and second dimensions for each of the plurality of UI elements and second properties of the one or more shadows; and displaying second portions of the plurality of UI elements and second portions of the one or more shadows based at least in part upon the second position and the second dimensions of each of the plurality of UI elements and the second properties of the one or more shadows, and wherein, determining the first properties or the second properties of the one or more shadows, further includes:

updating state information with a current position and current dimensions of each of the plurality of UI elements;

for each UI element of the plurality of UI elements that casts a shadow,
  determining a position and dimensions for the shadow based at least in part upon the current position and the current dimensions of the UI element, the current position and the current dimensions of each of the plurality of UI elements that are positioned at a lower depth than the UI element, and whether the shadow intersects one of the plurality of UI elements that are positioned at the lower depth; and
  updating the state information with the position and the dimensions for the shadow.

6. The computer-implemented method of claim 5, further comprising:
  for each UI element of the plurality of UI elements,
  determining current properties of each shadow positioned at a depth corresponding to the UI element based at least in part upon the current position and the current dimensions of the UI element, the current position and the current dimensions of each of the plurality of UI elements that are positioned at a higher depth than the depth corresponding to the UI element, and whether each shadow positioned at the depth corresponding to the UI element intersects the UI element; and
  updating the state information with the current properties of each shadow positioned at the depth corresponding to the UI element.

7. The computer-implemented method of claim 6, wherein determining whether the shadow intersects one of the plurality of UI elements that are positioned at the lower depth or whether each shadow positioned at the depth corresponding to the UI element intersects the UI element are each based at least in part upon one or more of a k-dimensional tree, a binary space partitioning (BSP) tree, a quadtree, an octree, or a variation thereof.

8. The computer-implemented method of claim 5, wherein displaying the first portions of the plurality of UI elements and the first portions of the one or more shadows or the second portions of the plurality of UI elements and the second portions of the one or more shadows each include:
  determining whether a UI element portion of the first portions or the second portions of the plurality of UI elements intersects an opaque portion of one of the plurality of UI elements that is positioned at a higher depth than the UI element portion;
  rendering each UI element portion that does not intersect with the opaque portion;
  determining whether a shadow portion of the first portions or the second portions of the one or more shadows intersects the opaque portion of one of the plurality of UI elements that is positioned at the higher depth than the shadow portion;
  determining whether the shadow portion intersects one or more of the plurality of UI elements that are positioned at a same depth as the shadow portion; and
  rendering each shadow portion that does not intersect with the opaque portion and intersects the one or more of the plurality of UI elements that are positioned at the same depth as the shadow portion.

9. The computer-implemented method of claim 5, wherein the plurality of UI elements correspond to a plurality of depths, each of the plurality of depths correspond to one of a plurality of first quadtrees for storing first information relating to the plurality of UI elements and one of a plurality of second quadtrees for storing second information relating to the one or more shadows cast by the plurality of UI elements, and determining the first properties or the second properties of the one or more shadows includes:
  updating the plurality of first quadtrees based at least in part upon the first position and the first dimensions of each of the plurality of UI elements; and
  for each UI element of the plurality of UI elements that casts a shadow,
  determining current properties of the shadow based at least in part upon a current position and current dimensions of the UI elements, the current position and the current dimensions of each of the plurality of UI elements that are positioned at a lower depth than the UI element, and whether the shadow intersects one of the plurality of UI elements that are positioned at the lower depth; and
  updating a second quadtree of each lower depth based at least in part upon the current properties of the shadow.

10. The computer-implemented method of claim 5, wherein obtaining the information corresponding to the modification of the first position or the first dimensions of the at least one of the plurality of UI elements includes:
  capturing an image including at least a portion of a representation of a face of a user;
  determining a position of the at least the portion of the representation of the face of the user in the image; and
  estimating a relative position of the user based at least in part upon the position of the at least the portion of the representation of the face of the user in the image,
  wherein the modification of the first position or the first dimension of the at least one of the plurality of UI elements is based at least in part upon the relative position of the user.

11. The computer-implemented method of claim 5, wherein obtaining the information corresponding to the modification of the first position or the first dimensions of the at least one of the plurality of UI elements includes:
  capturing at least one of motion data or orientation data using at least one of an accelerometer, gyroscope, or magnetometer; and
  estimating a relative position of a user based at least in part upon the at least one of the motion data or the orientation data,
  wherein the modification of the first position or the first dimensions of the at least one of the plurality of UI elements is based at least in part upon the relative position of the user.

12. The computer-implemented method of claim 5, wherein obtaining the information corresponding to the modification of the first position or the first dimensions of the at least one of the plurality of UI elements includes:
  capturing a user interaction using an input element,
  wherein the modification of the first position or the first dimensions of the at least one of the plurality of UI elements includes a change of depth of the at least one of the plurality of UI elements.

13. The computer-implemented method of claim 5, wherein obtaining the information corresponding to the modification of the first position or the first dimensions of the at least one of the plurality of UI elements includes:
  obtaining the information from the computing device or a remote computing device,
  wherein the modification of the first position or the first dimensions of the at least one of the plurality of UI elements includes a change of depth of the at least one of the plurality of UI elements.

14. The computer-implemented method of claim 5, wherein determining the first properties or the second properties of the one or more shadows includes:
   obtaining properties of one or more virtual light sources; and
   for each UI element of the plurality of UI elements that casts the shadow,
   determining at least one of a color, an intensity, a blur amount, or a transparency amount for the shadow based at least in part upon the properties of the one or more virtual light sources,
   wherein the position and the dimensions of the shadow are further based at least in part upon the properties of the one or more virtual light sources.

15. The computer-implemented method of claim 14, further comprising:
   enabling a user to configure the properties of the one or more virtual light sources.

16. A non-transitory computer-readable storage medium storing instructions for providing a user interface, the instructions when executed by one or more processors causing a computing device to:
   determine a first position and first dimensions for each of a plurality of UI elements, the plurality of UI elements corresponding to a plurality of depths, each of the plurality of depths corresponding to one of a plurality of first quadtrees for storing first information relating to the plurality of UI elements and one of a plurality of second quadtrees for storing second information relating to the one or more shadows cast by the plurality of UI elements;
   updating the plurality of first quadtrees based at least in part upon the first position and the first dimensions of each of the plurality of UI elements;
   for each UI element of the plurality of UI elements that casts a shadow,
   determine a position and dimensions for the shadow based at least in part upon the first position and the first dimensions of the UI element, the first position and the first dimensions of each of the plurality of UI elements that are positioned at a lower depth than the UI element, and whether the shadow intersects one of the plurality of UI elements that are positioned at the lower depth;
   update a second quadtree of each lower depth based at least in part upon the position and the dimensions for the shadow;
   display first portions of the plurality of UI elements and first portions of one or more shadows based at least in part upon the plurality of first quadtrees and the plurality of second quadtrees;
   obtaining information corresponding to a modification of the first position or the first dimensions of at least one of the plurality of UI elements;
   determine, based at least in part upon the information corresponding to the modification of the first position or the first dimensions of the at least one of the plurality of UI elements, a second position and second dimensions for each of the plurality of UI elements;
   for each UI element of the plurality of UI elements having the second position of the UI element differing from the first position of the UI element or the second dimensions of the UI element differing from the first dimensions of the UI element,
   update one or more of the plurality of first quadtrees with the second position or the second dimensions of the UI element;
   determine second properties of the shadow cast by the UI element based at least in part upon the second position and the second dimensions of the UI element, the second position and the second dimensions of each of the plurality of UI elements that are positioned at a lower depth than the UI element, and whether the shadow intersects one of the plurality of UI elements that are positioned at the lower depth using the first quadtree of each lower depth; and
   update the second quadtree of each lower depth based at least in part upon the second properties of the shadow; and
   display second portions of the plurality of UI elements and second portions of the one or more shadows based at least in part upon the plurality of first quadtrees and the plurality of second quadtrees.

17. The non-transitory computer-readable storage medium of claim 16, wherein the instructions when executed further cause the computing device to:
   for each UI element of the plurality of UI elements having the second position of the UI element differing from the first position of the UI element or the second dimensions of the UI element differing from the first dimensions of the UI element,
   determine the second properties of each shadow positioned at the depth corresponding to the UI element based at least in part upon the second position and the second dimensions of each of the plurality of UI elements that are positioned at a higher depth than the depth corresponding to the UI element, and whether each shadow positioned at the depth corresponding to the UI element intersects the UI element using the second quadtree of the depth corresponding to the UI element; and
   update the second quadtree of the depth corresponding to the UI element with the second properties of each shadow intersecting the UI element.

18. The non-transitory computer-readable storage medium of claim 16, wherein the information corresponding to the modification of the first position or the first dimensions of the at least one of the plurality of UI elements includes at least one of:
   one or more images captured by a camera, the one or more images used at least in part to estimate a position of the user with respect to the computing device, the modification including a transformation of the at least one of the plurality of UI elements based at least in part upon the position of the user with respect to the computing device;
   motion or orientation data captured using at least one of an accelerometer, a gyroscope, or a magnetometer, the motion or orientation data used at least in part to estimate the position of the user with respect to the computing device, the modification including the transformation of the at least one of the plurality of UI elements based at least in part upon the position of the user with respect to the computing device;
   a user interaction captured by an input element, the modification including a change of depth of the at least one of the plurality of UI elements; or
   data obtained by the computing device, the modification including the change in the depth of the at least one of the plurality of UI elements.

19. The non-transitory computer-readable storage medium of claim 16, wherein the instructions when executed to cause the computing device to display the first portions of the plurality of UI elements and the first portions of the one or more shadows or the second portions of the plurality of UI elements and the second portions of the one or more shadows include causing the computing device to:
  determine whether a UI element portion of the first portions or the second portions of the plurality of UI elements intersects an opaque portion of one of the plurality of UI elements that is positioned at a higher depth than the UI element portion using the first quadtree of each higher depth;
  render each UI element portion that does not intersect with the opaque portion;
  determine whether a shadow portion of the first portions or the second portions of the one or more shadows intersects the opaque portion of one of the plurality of UI elements that is positioned at the higher depth than the shadow portion using the first quadtree of each higher depth;
  determine whether the shadow portion intersects one or more of the plurality of UI elements that are positioned at a same depth as the shadow portion using the second quadtree of the depth corresponding to the shadow portion; and
  render each shadow portion that does not intersect with the opaque portion and intersects the one or more of the plurality of UI elements that are positioned at the same depth as the shadow portion.

* * * * *